US005186000A

United States Patent [19]

Hirata et al.

[11] Patent Number: 5,186,000

[45] Date of Patent: Feb. 16, 1993

[54] HYDRAULIC DRIVE SYSTEM FOR CONSTRUCTION MACHINES

[75] Inventors: Toichi Hirata, Ushiku; Genroku Sugiyama, Ibaraki; Yusuke Kajita, Tsuchiura, all of Japan

[73] Assignee: Hitachi Construction Machinery Co., Ltd., Tokyo, Japan

[21] Appl. No.: 861,395

[22] Filed: Mar. 31, 1992

Related U.S. Application Data

[62] Division of Ser. No. 439,387, Nov. 16, 1989, Pat. No. 5,134,853.

[30] Foreign Application Priority Data

| | | | |
|---|---|---|---|
| May 10, 1988 | [JP] | Japan | 63-111453 |
| Feb. 13, 1989 | [JP] | Japan | 1-31204 |
| Apr. 3, 1989 | [JP] | Japan | 1-81510 |

[51] Int. Cl.[5] .......... F16D 31/02

[52] U.S. Cl. .......... 60/420; 60/459; 91/518; 91/447

[58] Field of Search .......... 60/420, 459, 706, 452, 60/426, 427, 532, 421; 91/518, 514, 508, 446, 447

[56] References Cited

U.S. PATENT DOCUMENTS

| | | | |
|---|---|---|---|
| 3,987,622 | 10/1976 | Johnson | 60/420 |
| 4,087,968 | 5/1978 | Bianchetta | 60/445 |
| 4,165,613 | 8/1979 | Bernhoft et al. | 60/420 |
| 4,417,502 | 11/1983 | Shore | 91/447 |
| 4,425,759 | 1/1984 | Krusche | 60/420 |
| 4,475,442 | 10/1984 | Breeden | 91/446 X |
| 4,508,013 | 4/1985 | Barbagli | 91/518 |
| 4,617,854 | 10/1986 | Kropp | 91/517 |
| 4,635,439 | 1/1987 | Wible | 60/426 |
| 4,739,617 | 4/1988 | Kreth et al. | 60/426 |
| 4,856,278 | 8/1989 | Widmann et al. | 60/426 |
| 4,864,822 | 9/1989 | Wachs et al. | 60/427 |
| 4,938,023 | 7/1990 | Yoshino | 91/518 |
| 4,945,723 | 8/1990 | Izumi et al. | 91/518 X |

FOREIGN PATENT DOCUMENTS

| | | |
|---|---|---|
| 3422165 | 12/1984 | Fed. Rep. of Germany . |
| 2587419 | 9/1986 | France . |
| 58-31486 | 7/1983 | Japan . |
| 59-226702 | 12/1984 | Japan . |
| 1436829 | 8/1974 | United Kingdom . |
| 2195745 | 10/1986 | United Kingdom . |

*Primary Examiner*—Edward K. Look
*Assistant Examiner*—Hoang Nguyen
*Attorney, Agent, or Firm*—Fay, Sharpe, Beall, Fagan, Minnich & McKee

[57] ABSTRACT

A hydraulic drive system for construction machines includes a hydraulic pump (1), a plurality of hydraulic actuators (2, 3) driven by a hydraulic fluid supplied from the hydraulic pump, a plurality of flow control valves (4, 5) for controlling flow rates of the hydraulic fluid supplied to the actuators, respectively, and a plurality of distribution compensating valves (6, 7) for controlling differential pressures across the flow control valves, respectively, the plurality of actuators including a first actuator (2) which undergoes a relatively large load pressure and a second actuator (3) which undergoes a smaller load pressure than that of the first actuator. Distribution controllers (22, 23) are provided to control the distribution compensating valve (7) associated with the second actuator (3) such that a differential pressure (Pz2–PL2) across the flow control valve (5) associated with the second actuator (3) becomes larger than a differential pressure (Pz1–PL1) across the flow control valve (4) associated with the first actuator (2), when the first and second actuators (2, 3) are driven simultaneously.

3 Claims, 14 Drawing Sheets

HYDRAULIC DRIVE SYSTEM FOR CONSTRUCTION MACHINES

This is a divisional application of Ser. No. 07/439,387, filed Nov. 16, 1989, now U.S. Pat. No. 5,134,853.

TECHNICAL FIELD

The present invention relates to a hydraulic drive system for construction machines such as hydraulic excavators, and more particularly, to a hydraulic drive system for construction machines suitable for reliably distributing and supplying hydraulic fluid from a hydraulic pump to a plurality of hydraulic actuators including a swing motor for driving a swing body and a boom cylinder for driving a boom of the hydraulic excavator, by way of example, which actuators are subject to a relatively large difference between their load pressures, for the combined operation of the driven members.

BACKGROUND ART

Recently, in a hydraulic drive system for construction machines, such as hydraulic excavators and cranes, each equipped with a plurality of hydraulic actuators for driving a plurality of driven members, it is customary to control the discharge pressure of a hydraulic pump in response to load pressures or demanded flow rates, and to arrange pressure compensating valves in association with flow control valves for controlling the differential pressures across the flow control valves by the associated pressure compensating valves, so that the supplied flow rates are steadily controlled when simultaneously driving the hydraulic actuators. Commonly known as a typical example of controlling the discharge pressure of the hydraulic pump in response to the load pressures is load-sensing control.

The load-sensing control system controls the discharge rate of the hydraulic pump such that the discharge pressure of the hydraulic pump becomes higher by a fixed value than the maximum load pressure among the plurality of hydraulic actuators. This control increases and decreases the discharge rate of the hydraulic pump in response to the load pressures of the hydraulic actuators, thereby permitting economical operation.

Since the discharge rate of the hydraulic pump has an upper limit, i.e., available maximum flow rate, the pump discharge rate will be insufficient when the hydraulic pump reaches the available maximum flow rate in case of simultaneously driving the plural actuators. This is generally known as saturation of the hydraulic pump. If saturation occurs, the hydraulic fluid discharged from the hydraulic pump will flow into the actuator(s) on the lower pressure side in preference to other actuator(s) on the higher pressure side, the latter actuator(s) being hence supplied with insufficient rates of hydraulic fluid, with the result that the plural actuators cannot be driven simultaneously.

To solve the above problem, with a hydraulic drive system as described in DE-A1-3422165 (corresponding to JP-A 60-11706), two drive parts respectively acting in the valve-opening and -closing directions are provided on each pressure compensating valve for controlling the differential pressure across a flow control valve, in place of a spring for setting a target value of the differential pressure across the flow control valve. The discharge pressure of a hydraulic pump is introduced to the drive part acting in the valve-opening direction, and the maximum load pressure among the plural actuators is introduced to the drive part acting in the valve-closing direction. Thus, a control force in accordance with the differential pressure between the pump discharge pressure and the maximum load pressure is caused to act in the valve-opening direction for setting a target value of the differential pressure across the flow control valve. When saturation of the hydraulic pump occurs in the foregoing arrangement, the differential pressure between the pump discharge pressure and the maximum load pressure is reduced correspondingly. Therefore, the target value of the differential pressure across the flow control valve for each pressure compensating valve is also reduced and the pressure compensating valve associated with the actuator on the lower pressure side is further restricted, so that the hydraulic fluid from hydraulic pump is prevented from flowing into the actuator on the lower pressure side with preference. This allows the hydraulic fluid from the hydraulic pump to be distributed corresponding to relative ratios of the demanded flow rates (opening degrees) of the flow control valves and to be supplied to the plural actuators, thereby permitting appropriate simultaneous drive of the actuators.

Such a capability of the pressure compensating valve of reliably distributing and supplying the hydraulic fluid from the hydraulic pump to the plural actuators, irrespective of any discharge condition of the hydraulic pump, is called a "distribution compensating" function in this description for convenience, and hence that pressure compensating valve is called a "distribution compensating valve" in this description.

Meanwhile, when the above hydraulic drive system adopts, as its plural actuators, such actuators as subjected to a relatively large difference between their load pressures, for example, a swing motor and a boom cylinder for respectively driving a swing body and a boom of the hydraulic excavator, and is employed to carry out the combined operation of the swing body and the boom, the following problem has been caused due to a difference in the load pressure therebetween.

When the swing motor and the boom cylinder are driven simultaneously to carry out the combined operation of swing and boom-up for loading earth onto trucks, the above-mentioned function of the distribution compensating valve allows, at the beginning of the combined operation, the flow rate of hydraulic fluid to be distributed to the swing motor and the boom cylinder in accordance with relative ratios of the demanded flow rates of the flow control valve for swing and the flow control valve for boom-up. This will attempt to speed up the swing body responsive to the distributed flow rate. In practice, however, because the swing body has large inertia and the swing motor is subjected to the substantially large load pressure, most of the flow rate supplied to the swing motor is released from a relief valve, and hence not utilized as effective energy. At this time, the pump discharge pressure is so controlled as to become higher by a fixed value than the accelerating pressure of the swing motor on the maximum load pressure side under the load-sensing control. Letting the pump discharge pressure be 250 $kg/cm^2$, since the pressure necessary for boom-up is on the order of about 100 $kg/cm^2$, the difference of 150 $kg/cm^2$ is restricted by the distribution compensating valve associated with the boom cylinder and wasted in the form of heat.

Accordingly, this hydraulic drive system has faced the problems as follows. During the combined operation of swing and boom-up, the system is not economical because of large loss of energy. Furthermore, the flow rate supplied to the boom cylinder is distributed unreasonably in an attempt of carrying out the swing operation simultaneously. This restricts a lift amount of the boom and can cause the boom-up operation, to fail with the result that the working efficiency tends to diminish.

It is an object of the present invention to provide a hydraulic drive system for construction machines which can suppress the loss of energy and ensure the operative amount of actuator fluid pressure on the lower load pressure side, when simultaneously driving two hydraulic actuators which are subjected to a relatively large difference between their load pressures.

DISCLOSURE OF THE INVENTION

To achieve the above object, the present invention provides a hydraulic drive system for construction machines comprising a hydraulic pump, a plurality of hydraulic actuators driven by a hydraulic fluid supplied from the hydraulic pump, a plurality of flow control valves for controlling flow rates of the hydraulic fluid supplied to the actuators, respectively, and a plurality of distribution compensating valves for controlling differential pressures across the flow control valves, respectively. The plurality of actuators includes a first actuator which undergoes a relatively large load pressure and a second actuator which undergoes a smaller load pressure than that of the first actuator, wherein the hydraulic drive system further comprises distribution control means for controlling the distribution compensating valve associated with the second actuator such that a differential pressure across the flow control valve associated with the second actuator becomes larger than a differential pressure across the flow control valve associated with the first actuator, when the first and second actuators are driven simultaneously.

With the present invention thus arranged, since the differential pressure across the flow control valve associated with the second actuator is controlled to be larger than the differential pressure across the flow control valve associated with the first actuator during simultaneous drive of the first and second actuators, the second actuator is supplied with a flow rate larger than the intrinsic one as obtained when the discharge rate of the hydraulic pump is distributed corresponding to relative ratios of the opening degrees of the two flow control valves, whereas the first actuator is supplied with a flow rate smaller than the intrinsic one as distributed corresponding to relative ratios of the opening degrees of the two control valves. This ensures the operability of the second actuator and reduces that portion of the flow rate supplied to the second actuator which is released from a relief valve. In addition, the fact that the differential pressure across the flow control valve associated with the first actuator is controlled to become larger means control to increase the opening degree of the distribution compensating valve, and hence the amount of heat generated at the distribution compensating valve, is reduced.

Meanwhile, during simultaneous drive of the second actuator and a third actuator other than the first and second actuators, since the control force generator means does not function, the distribution compensating valves associated with the second and third actuators function conventionally. Specifically, these distribution compensating valves are operated to make differential pressures across the associated flow control valves equal to each other, so that the second and third actuators are supplied with intrinsic flow rates as distributed corresponding to relative ratios of the opening degrees of the two flow control valves, thereby permitting proper simultaneous drive of the second and third actuators.

According to one aspect of the present invention, the distribution compensating valves associated with the first and second actuators can be each of a distribution compensating valve of the type described in the above-stated DE-A1-3422165, i.e., a distribution compensating valve which comprises first drive means for applying a first control force thereto in the valve-closing direction in accordance with the differential pressure across the associated flow control valve, and second drive means for applying a second control force thereto in the valve-opening direction to determine a target value of the differential pressure across the associated flow control valve. In this case, the distribution control means controls the second control force applied to the distribution compensating valve associated with the second actuator to be larger than the second control force applied to the distribution compensating valve associated with the first actuator, when the first and second actuators are driven simultaneously.

In one embodiment, the second drive means of the distribution compensating valves associated with the first and second actuators comprise third drive means for urging the distribution compensating valves in the valve-opening direction with third control forces, and fourth drive means for urging the distribution compensating valves in the valve-closing direction with fourth control forces smaller than the third control forces, respectively, the aforesaid second control forces being applied in accordance with differences between the third control forces and the fourth control forces. The distribution control means has control force reducer means responsive to drive of the first actuator for reducing the fourth control forces of the fourth drive means.

In another embodiment, the second drive means of the distribution compensating valves associated with the first and second actuators may comprise single drive means for urging the distribution compensating valves in the valve-opening direction with the second control forces, respectively, and the distribution control means may include drive detector means for detecting drive of at least the first actuator, and control force generator means for allowing the second drive means of the distribution compensating valves associated with the second actuator to apply, as the second control force, a control force larger than the second control force applied by the second drive means of the distribution compensating valve associated with the first actuator, when drive of the first actuator is detected by drive detector means.

In this case, the drive detector means may comprise a drive detecting sensor responsive to drive of the first actuator for outputting an electric signal, and the control force generator means includes a differential pressure sensor for detecting a differential pressure between a discharge pressure of the hydraulic pump and a maximum load pressure among the plurality of actuators and then outputting an electric signal corresponding to the differential pressure detected, a controller responsive to both the electric signal output from the drive detector means and the electric signal output from the differential pressure sensor for computing a value of the second control force to be applied by the second drive means of the distribution compensating valve associated with the second actuator and then outputting an electric signal corresponding to the computed value, and control pressure generator means for generating a control pressure corresponding to the electric signal output from the controller and for outputting the control pressure to the second drive means of the distribution compensating valve associated with the second actuator.

Alternatively, the drive detector means may comprise hydraulic lead means responsive to drive of the first actuator for outputting a hydraulic signal, and the control force generator means may include a control pressure generator means for generating a control pressure based on both a differential pressure between a discharge pressure of the hydraulic pump and a maximum load pressure among the plurality of actuators, and the hydraulic signal output from the hydraulic lead means, and for outputting the control pressure to the second drive means of the distribution compensating valve associated with the second actuator.

Alternatively, the drive detector means may comprise first drive detecting sensors responsive to drive of the first actuator for outputting an electric signal and second drive detecting sensors responsive to drive of the second actuator in either of two drive directions for outputting an electric signal, and the control force generator means may include a differential pressure sensor for detecting a differential pressure between a discharge pressure of the hydraulic pump and a maximum load pressure among the plurality of actuators and for outputting an electric signal corresponding to the differential pressure detected, a controller responsive to both the electric signals output from the first and second drive detecting sensors and the electric signal output from the differential pressure sensor for computing a value of the second control force to be applied by the second drive means of the distribution compensating valve associated with the second actuator and for outputting an electric signal corresponding to the computed value, and control pressure generator means for generating a control pressure corresponding to the electric signal output from the controller and for outputting the control pressure to the second drive means of the distribution compensating valve associated with the second actuator.

Further, where the plurality of actuators include a third actuator different from the first and second actuators, a distribution compensating valve associated with the third actuator may comprise, like the distribution compensating valves associated with the first and second actuators, first drive means for applying a first control force thereto in the valve-closing direction in accordance with a differential pressure across the associated flow control valve, and second drive means for applying a second control force thereto in the valve-opening direction to determine a target value of the differential pressure across the associated flow control valve. The drive detector means may comprise a drive detecting sensor responsive to drive of the first actuator for outputting an electric signal. The control force generator means may include a differential pressure sensor for detecting a differential pressure between a discharge pressure of the hydraulic pump and a maximum load pressure among the plurality of actuators and for outputting an electric signal corresponding to the differential pressure detected, a controller responsive to both the electric signal output from the drive detecting sensor and the electric signal output from the differential pressure sensor for computing values of the second control forces to be applied by the second drive means of the distribution compensating valves associated with the first, second and third actuators, respectively, and for outputting electric signals corresponding to the computed values, and control pressure generator means for generating control pressures corresponding to the electric signals output from the controller and for outputting the control pressures to the second drive means of the distribution compensating valves associated with the first, second and third actuators, respectively. The controller may compute, as the second control force to be applied by the second drive means of the distribution compensating valve associated with the second actuator, a first value when no electric signal is output from the drive detector means, and a second value larger than the first value when the electric signal is output from the drive detector means.

In still another aspect of the present invention, the plurality of distribution compensating valves may be each a distribution compensating valve of the type as described in U.S. Pat. No. 4,425,759, GB-A 2195745 and JP-B2-58-31486, i.e., a distribution compensating valve which is disposed downstream of the associated flow control valve, having piston means subjected to a pressure on the downstream side of the associated flow control valve in the valve-opening direction and the maximum load pressure among the plurality of actuators in the valve-closing direction. In this case, the piston means of the distribution compensating valve associated with the first actuator has a first pressure receiving portion subjected to the pressure on the downstream side of the associated flow control valve and acting in the valve-opening direction, and a second pressure receiving portion subjected to the maximum load pressure among the plurality of actuators and acting in the valve-closing direction, whereas the piston means of the distribution compensating valve associated with the second actuator has a third pressure receiving portion subjected to the pressure on the downstream side of the associated flow control valve and acting in the valve-opening direction, and fourth and fifth pressure receiving portions subjected to the maximum load pressure among the plurality of actuators and acting in the valve-closing direction, the fourth and fifth pressure receiving portions having the total of their pressure receiving areas substantially equal to the pressure receiving area of the third pressure receiving portion. The distribution control means has pressure reducer means responsive to drive of the first actuator for cutting off communication of one of the fourth and fifth pressure receiving portions with the maximum load pressure.

Further, in that case, the piston means of the distribution compensating valve associated with the second actuator may comprise two pistons corresponding to directions of operation of the second actuator, and the other of the fourth and fifth pressure receiving portions of the two pistons may have its pressure receiving area different from the other.

In addition, distribution compensating valves are usually disposed in main circuits. However, when using a distribution compensating valve of the type described in U.S. Pat. No. 4,535,809, i.e., a flow control valve means of the seat valve type including at least one seat valve assembly each of which comprises a main valve of the seat valve type disposed in a main circuit, a pilot circuit associated with the main valve, and a pilot valve disposed in the pilot circuit for controlling the main valve, the distribution compensating valve is disposed in the pilot circuit to control a differential pressure across the pilot valve which functions as a flow control valve.

BEST MODE FOR CARRYING OUT THE INVENTION

The following is description of preferred embodiments of the present invention, which are implemented in a hydraulic excavator, with reference to the drawings.

First Embodiment

To begin with, a first embodiment of the present invention will be described by referring to FIGS. 1 and 2.

Figure 1:
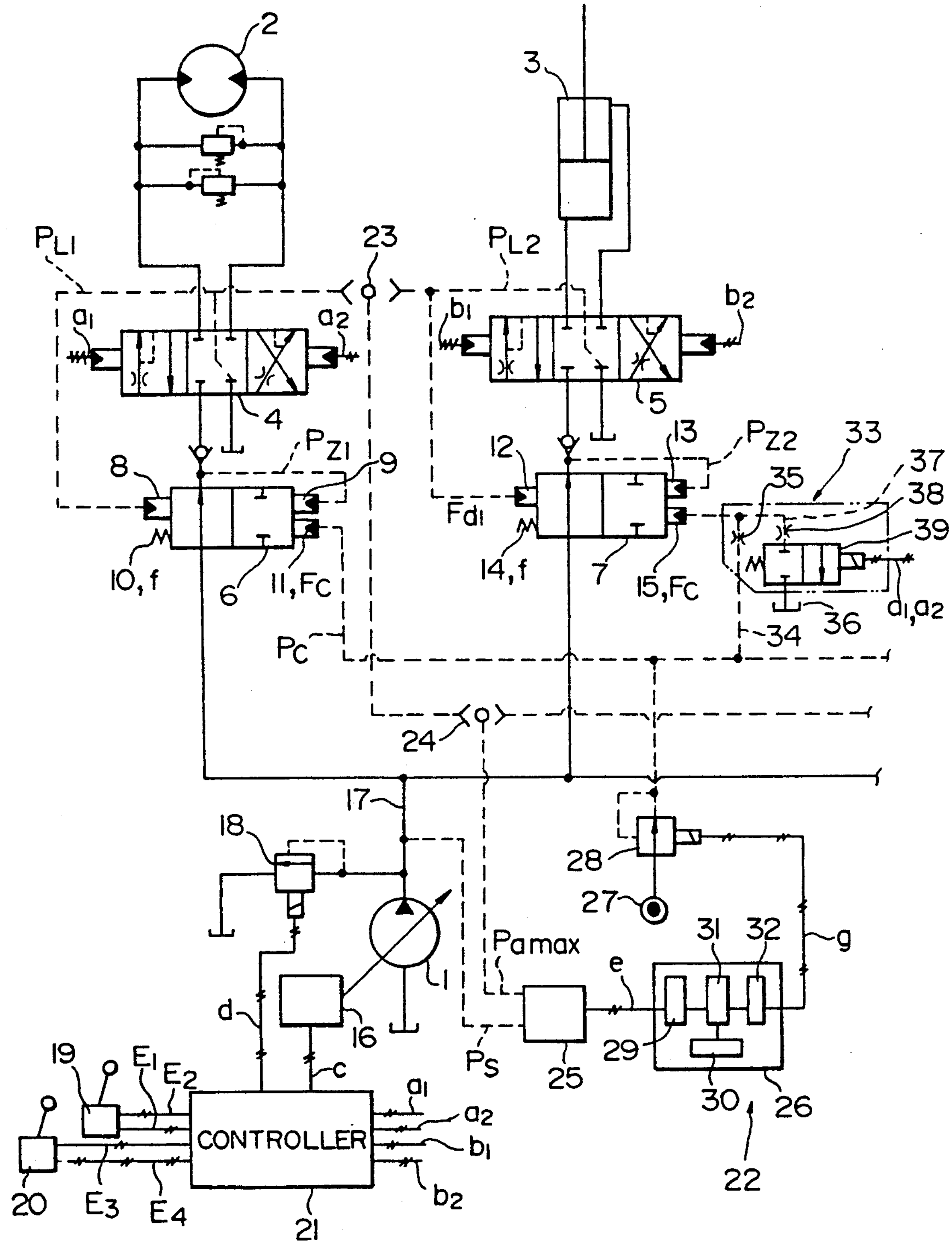
FIG. 1 is a circuit diagram of a hydraulic drive system for construction machines according to a first embodiment of the present invention.

Referring to FIG. 1, a hydraulic drive system of this embodiment comprises a variable displacement hydraulic pump 1 of swash plate type, and a plurality of hydraulic actuators driven by hydraulic fluid delivered from the hydraulic pump 1. These actuators include a first hydraulic actuator for driving a swing body of a hydraulic excavator, i.e., swing motor 2, and a second hydraulic actuator for driving a boom of the hydraulic excavator, i.e., boom cylinder 3. The hydraulic drive system also comprises solenoid-operated flow control valves 4, 5 driven by electric signals a1, a2 and b1, b2 for controlling flow rates of hydraulic fluid supplied to the swing motor 2 and the boom cylinder 3, respectively, and distribution compensating valves 6, 7 for controlling differential pressures across the flow control valves 4, 5, respectively.

The distribution compensating valve 6 has a drive part 8 which is supplied with an outlet pressure PL1 of the flow control valve 4, as a load pressure of the swing motor 2, for urging the distribution compensating valve 6 in the valve-opening direction, and a drive part 9 which is supplied with an inlet pressure PZ1 of the flow control valve 4 for urging the distribution compensating valve 6 in the valve-closing direction. Thus, applied to the distribution compensating valve 6 is a first control force in the valve-closing direction based on a differential pressure PZ1–PL1 across the flow control valve 4. The distribution compensating valve 6 also includes a spring 10 for urging the distribution compensating valve 6 in the valve-opening direction with a force f, and a drive part 11 which is supplied with a control pressure Pc (described later) for urging the distribution compensating valve 6 in the valve-closing direction with a control force Fc. Thus, applied to the distribution compensating valve 6 is a second control force f−Fc obtained by subtracting the control force Fc due to the control pressure Pc from the force f of the spring 10. These first and second control forces acting opposite to each other by a restricted degree the distribution compensating valve for controlling the differential pressure across the flow control valve 4. Here, the second control force f−Fc determined by the spring 10 and the drive part 11 constitutes a target value of the differential pressure across the flow control valve 4.

Likewise, the distribution compensating valve 7 has a drive part 12 which is supplied with an outlet pressure PL2 of the flow control valve 5, as a load pressure of the boom cylinder 3, for urging the distribution compensating valve 7 in the valve-opening direction, a drive part 13 which is supplied with an inlet pressure PZ2 of the flow control valve 5 for urging the distribution compensating valve 7 in the valve-closing direction, a spring 14 for urging the distribution compensating valve 7 in the valve-opening direction with a force f, and a drive part 15 which is supplied with a control pressure Pc (described later) for urging the distribution compensating valve 7 in the valve-closing direction with the control force Fc.

The hydraulic pump 1 is provided with a pump regulator 16 which serves to change an inclined degree of the swash plate, i.e., displacement volume, in response to an electric signal c for controlling a discharge rate of the hydraulic pump. Connected to a discharge line 17 of the hydraulic pump 1 is an unload valve 18 for changing a setting pressure in response to an electric signal d and holding a discharge pressure of the hydraulic pump 1 at the setting pressure.

The flow control valves 4, 5 are driven under control of operation devices 19, 20, respectively. By way of example, operation devices 19, 20 output electric signals E1, E2 and E3, E4 dependent on the displacement and direction of operation of their control levers, respectively. These electric signals E1, E2 and E3, E4 are input to a first controller 21 in which electric signals a1, a2, b1, b2 for driving the flow control valves 4, 5 are created based on the electric signals E1, E2 and E3, E4 and then output to the drive parts of the flow control valves 4, 5. Based on the electric signals E1, E2 and E3, E4, the controller 21 also creates the electric signal c for determining the displacement volume of the hydraulic pump 1 and the electric signal d for determining the setting pressure of the unload valve 18, the signals c, d being output to the pump regulator 16 and the unload valve 18, respectively.

The electric signals c, d are created in the controller 21 as follows.

The controller 21 previously stores therein the relationship between the displacement of the operation device 19 and the displacement volume of the hydraulic pump 1, the relationship between the displacement of the operation device 20 and the pump displacement volume, the relationship between the displacement of the operation device 19 and the setting pressure of the unload valve 18, and the relationship between the displacement of the operation device 20 and the setting pressure of the unload valve 18. The relationships between the displacements of the operation devices 19, 20 and the pump displacement volumes are so set as to provide pump discharge rates slightly greater than the demanded flow rates indicated by the displacements of the operation devices 19, 20, respectively. The displacements of the operation devices 19, 20 and the setting pressure of the unload valve 18 are so set as to provide the pump discharge pressure in accordance with the displacements of the operation devices 19, 20.

When an operation device 19 or 20 is operated alone, the pump displacement volume and the setting pressure corresponding to the operational displacement of either unit are computed from the above-mentioned relationships, and then output in the form of the electric signals c, d, respectively. When both the operation devices 19 and 20 are operated simultaneously, the pump displacement volumes corresponding to the respective displacements are computed from the above-mentioned relationships and summed to obtain the total, which is then output in the form of the electric signal c, and the setting pressures of the unload valve 18 corresponding to the respective displacements are computed from the above-mentioned relationships, followed by selecting the higher one of the two setting pressures, which is then output in the form of the electric signal d. This permits the pump discharge flow rate satisfy the total demanded flow rate, and to establish a pressure in the discharge line 17 because of the discharge flow rate exceeding the total flow rate, thereby providing the discharge pressure corresponding to the setting pressure of the unload valve 18.

The control pressure Pc for generating the control force Fc in the drive parts 11, 15 of the distribution compensating valves 6, 7 is created by control force generator means 22. The control force generator means 22 comprises a differential pressure detector 25 for detecting a differential pressure between the discharge pressure Ps of the hydraulic pump 1 and the maximum load pressure Pamax among the plural actuators, inclusive of the swing motor 2 and the boom cylinder 3, introduced through shuttle vlaves 23, 24, and for outputting an electric signal e in accordance with the differential pressure. Control force generator means 22 further includes a second controller 26 for computing the control force Fc based on the electric signal e and for outputting an electric signal g in accordance with the computed control signal, and a solenoid proportional valve 28 operated in response to the electric signal g for producing the control pressure Pc proportional to the electric signal g from a constant pilot pressure of a hydraulic source 27.

The controller 26 comprises an input unit 29 to which the electric signal e is input, a storage unit 30 for storing therein the functional relation between the differential pressure Ps−Pamax indicated by the electric signal e and the control force Fc, an arithmetic unit 31 for reading the setting value stored in the storage unit 30 in accordance with the electric signal e applied from the input unit 29 and for determining the control force Fc corresponding to the differential pressure Ps−Pamax, and an output unit 32 for outputting the control force Fc determined by the arithmetic unit 31 in the form of the electric signal g.

Figure 2:
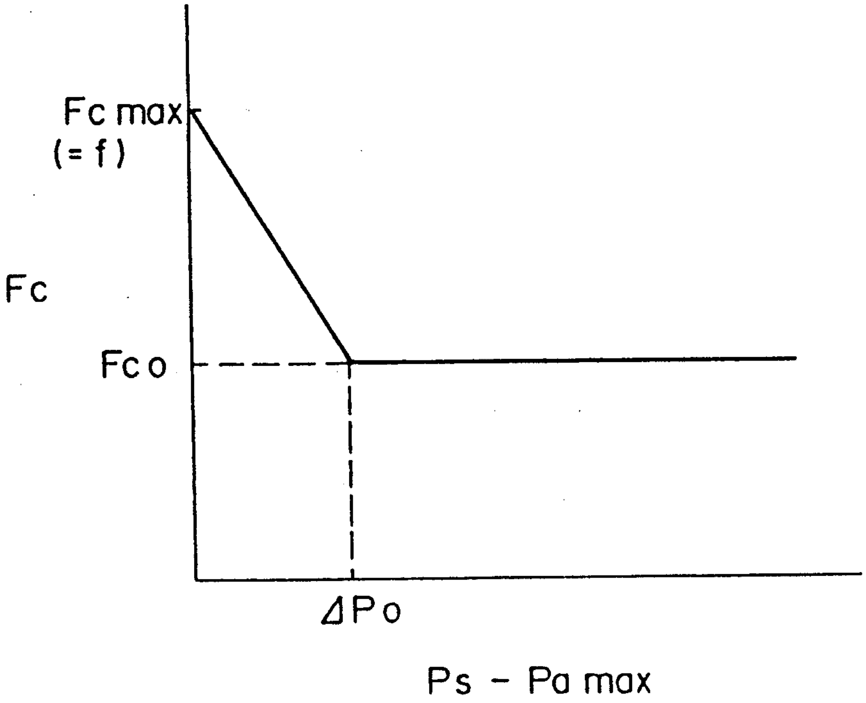
FIG. 2 is a graph showing the relationship between a differential pressure Ps-Pamax and a control force Fc to be set in a controller.

The functional relation between the differential pressure Ps−Pamax and the control force Fc stored in the storage unit 30 is as plotted in FIG. 2. Specifically, in a range where the differential pressure Ps−Pamax is larger than a predetermined value Δ Po, the control force Fc is given by a fixed value Fco. As the differential pressure Ps−Pamax is reduced below the predetermined value Δ Po, the control force Fc increases proportional to a reduction in the differential pressure, until it becomes the maximum value Pamax, which is equal to the force f of the spring 10, 13, at the point of the differential pressure Ps−Pamax=0. The relationship between the differential pressure Ps−Pamax and the control force Fc in the latter range is expressed by:

$$Fc=f-\alpha(Ps-Pamax) \quad (1)$$

where α is a proportional constant

Here, the predetermined value Δ Po is given by a value of the differential pressure Ps−Pamax as obtained when the hydraulic pump 1 reaches the available maximum flow rate and undergoes saturation.

The drive part 15 of the distribution compensating valve 7 is provided with a control force reducer means 33. The control force reducer means 33 comprises a restrictor 35 disposed in a hydraulic line 34 for introducing the control pressure Pc to the drive part 15, a hydraulic line 37 for communicating the drive part 15 with a tank 36, and a restrictor 38 and an on-off valve 39 both disposed in the hydraulic line 37. The on-off valve 39 is a solenoid-operated valve switched in response to the electrical signals a1, a2 such that it remains at a closed position as shown in the absence of the electrical signal a1 or a2 and is switched to an open position upon application of the electrical signal a1 or a2. The restrictor 35 is set to provide a relatively large restricting degree, while the restrictor 38 is set to provide a relatively small restricting degree. This setting of the restrictors 35, 38 makes the control pressure Pc introduced to the drive part 15 of the distribution compensating valve 7 equal to the control pressure Pc introduced to the drive part 11 of the distribution compensating valve 6 when the on-off valve 39 is in a closed position. When the on-off valve 39 is switched to an open position, the control pressure Pc introduced to the drive part 15 is reduced to make smaller the control force Fc exerted on the drive part 15.

Figure 3:
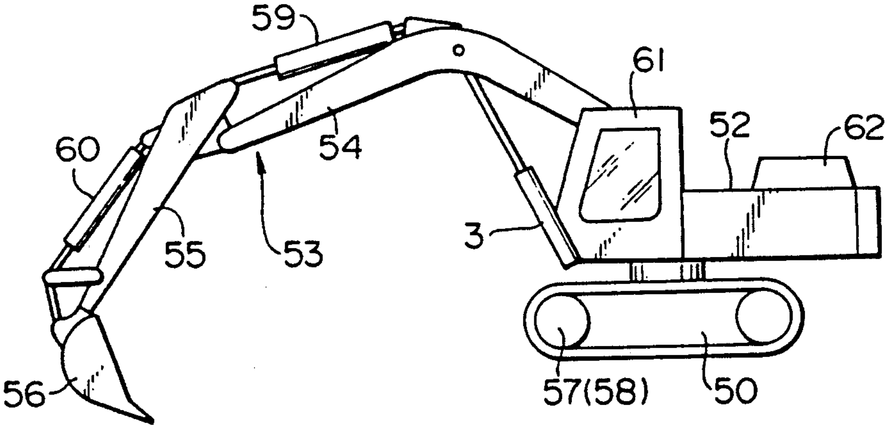
FIG. 3 is a side view of a hydraulic excavator as a typical example of construction machines in which the hydraulic drive system of the present invention is employed.
Figure 4:
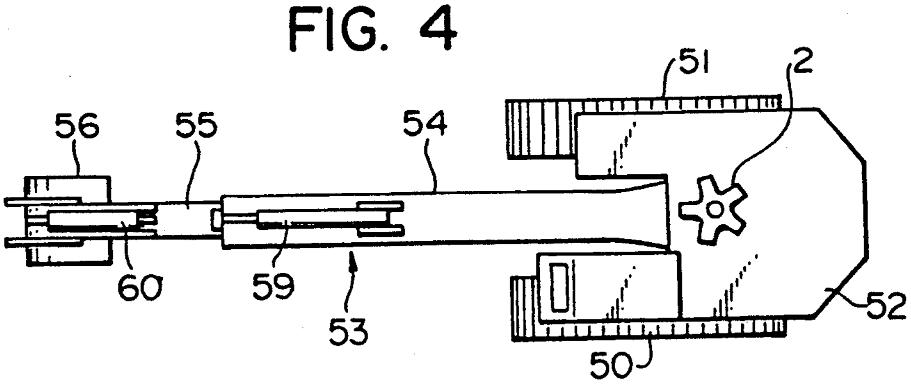
FIG. 4 is a plan view of the hydraulic excavator.

As shown in FIGS. 3 and 4, a hydraulic excavator equipped with the hydraulic drive system of this embodiment comprises a pair of left and right travel devices 50, 51, a swing body 52 swingably mounted on the travel devices 50, 51, and a front attachment 53 mounted on the swing body 52 for being rotatable in a vertical plane. The front attachment 53 comprises a boom 54, an arm 55, and a bucket 56. The swing body 52 and the boom 54 are driven by the swing motor 2 and the boom cylinder 3 mentioned above, respectively. The left and right travel devices 50, 51, the arm 55 and the bucket 56 are driven by left and right travel motors 57, 58, an arm cylinder 59, and a bucket cylinder 60, respectively.

Though not illustrated in FIG. 1, the plurality of hydraulic actuators driven by the hydraulic fluid from the hydraulic pump 1 include the travel motors 57, 58, the arm cylinder 59 and the bucket cylinder 60. These actuators are each provided with a flow control valve and a distribution compensating valve in a like manner.

The swing body 52 incorporates various equipment such as an operation cab 61, a prime mover 62, the hydraulic pump 1 (see FIG. 1), etc. and mounts thereon the front mechanism as mentioned above, and hence presents a load of very large inertia. A typical example of combined operation of the swing body 52 and the boom 54 is the combination of swing and boom-up to be implemented when loading dug earth onto trucks or the like. At the beginning of such a combined operation, the load pressure of the swing motor 2 is raised up to its relief pressure, while the load pressure of the boom cylinder 3 is not so raised up. In other words, the swing motor 2 is an actuator subjected to a relatively large load pressure, and the boom cylinder 3 is an actuator subjected to a smaller load pressure than the swing motor 2.

Operation of this embodiment thus constructed will now be described.

When either the swing body 52 or the boom 54 is solely operated by actuating the operation device 19 or 20 alone, the hydraulic pump 1 will not normally reach an upper limit of the discharge rate, i.e., available maximum flow rate, and hence the differential pressure Ps−Pamax normally exceeds the predetermined value Δ Po. Therefore, the controller 26 determines the fixed control force Fco from the functional relation shown in FIG. 2, and the solenoid proportional valve 28 produces the control pressure Pc corresponding to the fixed control force Fco. During sole operation of the swing body 52, although the on-off valve 39 is switched to an open position in response to the electric signal a1 or a2, the solenoid proportional valve 28 will not be affected in producing the control pressure Pc with the presence of the restrictor 35. The control pressure Pc is applied to the drive part 11 of the distribution compensating valve 6 or the drive part 15 of the distribution compensating valve 7 for creating the fixed control force Fco at the drive part 11 or 15, whereby the fixed control force f−Fco is applied to the distribution compensating valve 6 or 7 in the valve-opening direction. Accordingly, the flow control valve 4 or 5 is so controlled as to keep constant the differential pressure across same, with the result that the swing motor 2 or the boom cylinder 3 is supplied with a flow rate corresponding to the opening degree of the flow control valve 4 or 5 irrespective of fluctuations in the load pressure.

When the boom 54 and a driven member other than the swing body 52 are operated in a combined manner, e.g., during the combined operation of the boom and the arm as implemented when digging earth, the controller 26 determines the control force Fc from the functional relation shown in FIG. 2, and the solenoid proportional valve 28 produces the control pressure Pc corresponding to the control force Fc. The control pressure Pc is applied, as an equivalent pressure, to the drive part 15 of the distribution compensating valve 7 and a drive part of a distribution compensating valve associated with another actuator (not shown) for creating the equal control pressure Pc to those two drive parts, whereby the equal control force f−Fc is applied to the two distribution compensating valves in the valve-opening direction. Therefore, when there is a difference in the load pressure between the two actuators, the distribution compensating valve associated with the actuator on the lower load pressure side is moved in the valve-closing direction, namely restricted, to a larger extent so that the differential pressures across the flow control valve 5 and the flow control valve associated with another actuator are controlled to become equal to each other. This suppresses the hydraulic fluid from passing to the actuator on the lower load pressure side preferentially, whereby the two actuators are supplied with flow rates distributed corresponding to relative ratios of the demanded flow rates (opening degrees) of the two flow control valves for enabling the proper combined operation of the boom 54 and the other driven member.

In this connection, before the hydraulic pump 1 reaches the available maximum flow rate, the differential pressure Ps−Pamax and hence the control force Fc are constant, so that the differential pressures across the flow control valve 5 and the flow control valve associated with the other actuator are each controlled to become constant. After the hydraulic pump 1 has reached the available maximum flow rate, the differential pressure Ps−Pamax is reduced below the predetermined value Δ Po and the control force Fc is increased as the differential pressure Ps−Pamax reduces. Thus, the control force f−Fc applied to the two distribution compensating valves is reduced with a decrease in the differential pressure Ps−Pamax, and the differential pressures across the two flow control valves also are reduced with a decrease in the differential pressure Ps−Pamax. Accordingly, even after the hydraulic pump 1 has reached the available maximum flow rate, the two actuators are supplied with the flow rates distributed properly for carrying out the smooth combined operation.

Next, there will be described the case of combined operation of the swing body 52 and the boom 54 by operating both the operation devices 19, 20 simultaneously, e.g., combined operation of swing and boom-up. In such a combined operation, the hydraulic pump 1 usually reaches the available maximum flow rate and undergoes saturation. Therefore, the differential pressure Ps−Pamax is reduced below the predetermined value Δ Po, whereupon the controller 26 determines the control force Fc from the functional relation shown in FIG. 2, the control force Fc being now increased with a decrease in the differential pressure Ps−Pamax, and the solenoid proportional valve 28 produces the control pressure Pc corresponding to the control force Fc. Meanwhile, at this time, the electric signal a1 or a2 is applied to the on-off valve 39 so that the on-off valve 39 is switched to an open position. Accordingly, the control pressure Pc produced by the solenoid proportional valve 28 is applied directly to the drive part 11 of the distribution compensating valve 6 and to the drive part 15 of the distribution compensating valve 7 after being reduced. Therefore, the control pressure Pc exerted on the drive part 15 of the distribution compensating valve 7 becomes smaller than the control pressure Pc exerted on the drive part 11 of the distribution compensating valve 6, whereby the control force f−Fc applied to the distribution compensating valve 7 in the valve-opening direction is made larger than that applied to the distribution compensating valve 6.

As a result of the control force f−Fc applied to the distribution compensating valve 7 in the valve-opening direction being made larger than that applied to the distribution compensating valve 6, at the beginning of combined operation of swing and boom-up, the distribution compensating valve 7 associated with the boom cylinder 3 on the lower load pressure side is restricted by the control force f−Fc to a smaller extent, so that the distribution compensating valve 7 is opened a degree slightly larger than would be the case if the control pressure Pc were directly applied to the valve 7. Accordingly, the differential pressure across the flow control valve 5 is controlled to be higher than the differential pressure across the flow control valve 5, so that the boom cylinder 3 is supplied with a flow rate larger than would be the case if the discharge rate (available maximum flow rate) of the hydraulic pump 1 were distributed corresponding to relative ratios of the opening degrees of the flow control valves 4, 5, whereas the swing motor 2 is supplied with a flow rate smaller than that as distributed corresponding to relative ratios of the opening degrees of the flow control valves 4, 5. As a consequence, the combined operation of swing and boom-up can be performed with certainty, while raising up the boom at a higher speed and turning the swing body at a relatively moderate speed.

With this embodiment, as described above, during a combined operation of other than one of the swing body 52 and the boom 54, the differential pressures across the flow control valves are controlled to become equal to each other for ensuring the proper combined operation. During the combined operation of swing and boom-up, the differential pressure across the flow control valve 5 associated with the boom cylinder 3 is controlled to be higher than the differential pressure across the flow control valve 4 associated with the swing motor 2, so that the boom cylinder 3 is supplied with a flow rate larger than would be the case if the pump discharge rate were distributed corresponding to relative ratios of the opening degrees of the flow control valves 4, 5, thereby permitting to ensure a sufficient lift extent of the boom cylinder 3 and hence good workability. Furthermore, since the flow rate supplied to the swing motor 2 is reduced, the relief amount of hydraulic fluid is also reduced during operation of the swing motor. At the same time, since the distribution compensating valve 7 associated with the boom cylinder 3 is increased in its opening degree, this contributes to reduce the amount of heat generated due to passing of the hydraulic fluid under high pressure, and to suppress the loss of energy.

SECOND EMBODIMENT

Figure 5:
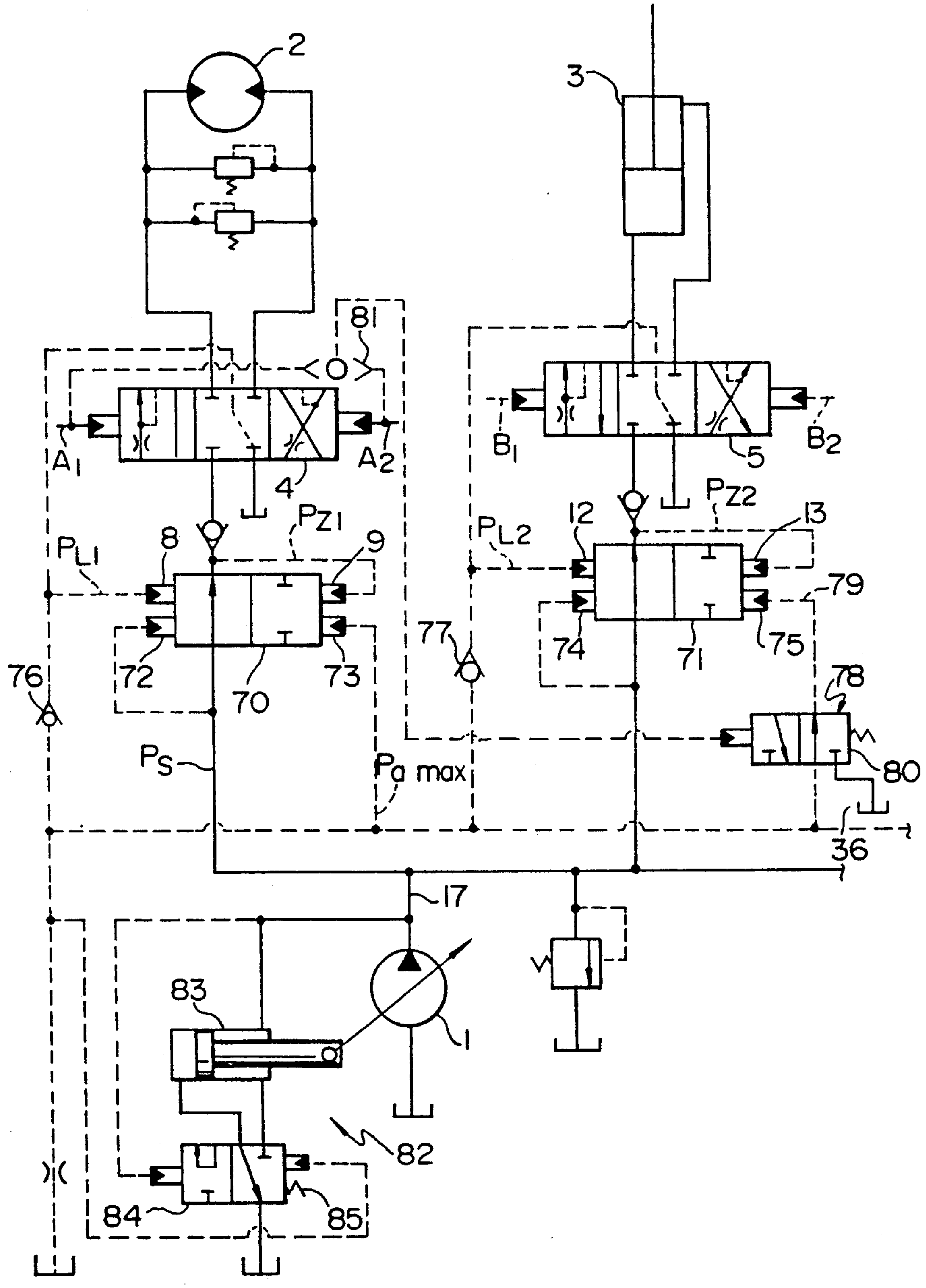
FIG. 5 is a circuit diagram of the hydraulic drive system according to a second embodiment of the present invention.

A second embodiment of the present invention will be described below with reference to FIG. 5. In FIG. 5, the identical components to those shown in FIG. 1 are denoted by the same characters. Note that, in this embodiment, the valve of the type described in DE-A 3,422,165 is used as a distribution compensating valve.

Referring to FIG. 5, a flow control valve 4 for controlling flow of the hydraulic fluid supplied to a swing motor 2 and a flow control valve 5 for controlling flow of the hydraulic fluid supplied to a boom cylinder 3 are driven with pilot pressures A1, A2 and B1, B2 produced by respective operation devices (not shown) under the pilot configuration.

Upstream of the flow control valves 4, 5, there are disposed distribution compensating valves 70, 71 of the type described in DE-A 3,422,165, respectively. More specifically, the distribution compensating valve 70 has a drive part 8 which is supplied with an outlet pressure PL1 of the flow control valve 4, as a load pressure of the swing motor 2, for urging the distribution compensating valve 70 in the valve-opening direction, and a drive part 9 which is supplied with an inlet pressure Pz1 of the flow control valve 4 for urging the distribution compensating valve 70 in the valve-closing direction. Thus, applied to the distribution compensating valve 70 is a first control force in the valve-closing direction based on a differential pressure Pz1−PL1 across the flow control valve 4. The distribution compensating valve 70 also includes, in place of the spring 10 and the drive part 11 in the first embodiment, a drive part 72 for urging the distribution compensating valve 70 in the valve-opening direction and a drive part 73 for urging the distribution compensating valve 70 in the valve-closing direction, the drive part 72 being supplied with a discharge pressure Ps and the drive part 73 being supplied with the maximum load pressure Pamax among the plural actuators, inclusive of the swing motor 2 and the boom cylinder 3, through check valves 76, 77. Thus, applied to the distribution compensating valve 70 is a second control force in the valve-opening direction based on a differential pressure Ps−Pamax between the pump discharge pressure and the maximum load pressure. This second control force based on the differential pressure Ps−Pamax presents a target value of the differential pressure Pz1−PL1 across the flow control valve 4.

Likewise, the distribution compensating valve 71 has a drive part 12 which is supplied with an outlet pressure PL2 of the flow control valve 5, as a load pressure of the boom cylinder 3, for urging the distribution compensating valve 71 in the valve-opening direction, a drive part 13 which is supplied with an inlet pressure Pz2 of the flow control valve 5 for urging the distribution compensating valve 71 in the valve-closing direction, a drive part 74 which is supplied with the discharge pressure Ps of the hydraulic pump 1 for urging the distribution compensating valve 71 in the valve-opening direction, and a drive part 75 which is supplied with the maximum load pressure Pamax for urging the distribution compensating valve 71 in the valve-closing direction.

The drive part 75 of the distribution compensating valve 71 associated with the boom cylinder 3 is provided with a control force reducer means 78. The control force reducer means 78 has a selector valve 80 disposed in a hydraulic line 79 for introducing the maximum load pressure Pamax to the drive part 75. The selector valve 80 is operated in a pilot-type manner responsive to the pilot pressure A1 or A2 taken out through a shuttle valve 81 and then applied to the flow control valve 4. In the absence of the pilot pressure A1 or A2, the selector valve 80 is at a position as illustrated for introducing the maximum load pressure Pamax to the driver part 75. Upon the pilot pressure A1 or A2 being applied, the selector valve 80 is switched from the illustrated position so as to communicate the drive part 75 with a tank 36. Thus, application of the pilot pressure A1 or A2 causes the tank pressure to be introduced to the drive part 75, thereby increasing the second control force applied to the distribution compensating valve 71 in the valve-opening direction.

The hydraulic pump 1 is provided with a pump regulator 82 of the load-sensing control type that serves to control the pump discharge such that the discharge pressure Ps is held higher by a fixed value than the maximum load pressure Pamax. The pump regulator 82 comprises a hydraulic cylinder 83 for driving a swash plate of the hydraulic pump 1 and changing the displacement volume thereof, and a control valve 84 for adjusting a positional shift of the hydraulic cylinder 83. The control valve 84 has at its one end a drive part which is provided with a spring 85 and supplied with the maximum load pressure Pamax, and at its opposite end a drive part which is supplied with the pump discharge pressure Ps. When the maximum load pressure Pamax is raised up, the control valve 84 is operated correspondingly to adjust a positional shift of the hydraulic cylinder 83 for increasing the displacement volume of the hydraulic pump 1 and hence the discharge rate thereof. This enables the discharge pressure Ps of the hydraulic pump 1 to be constantly held at a higher level by a fixed value which is determined by the spring 85.

Operation of this embodiment thus constructed will now be described.

When the swing body or the boom is solely operated, the discharge rate of the hydraulic pump 1 is subjected to load-sensing control for keeping constant the differential pressure between the pump discharge pressure Ps and the maximum load pressure Pamax, so that the swing motor 2 or the boom cylinder 3 is supplied with a flow rate corresponding to the opening degree of the flow control valve 4 or 5. At this time, the distribution compensating valve 70 or 71 is held at its fully open position by the control force in the valve-opening direction based on the differential pressure Ps−Pamax applied through the drive parts 72, 73 or 74, 75, whereby the differential pressure across the flow control valve 4 or 5 substantially coincides with the differential pressure Ps−Pamax. Accordingly, the swing motor 2 or the boom cylinder 3 is supplied with a flow rate corresponding to the opening degree of the flow control valve 4 or 5 irrespective of fluctuations in the load pressure.

When the boom and a driven member other than the swing body are operated in a combined manner, the drive parts 74, 75 of the distribution compensating valve 71 and corresponding drive parts of a distribution compensating valve associated with another actuator (not shown) are supplied with the pump discharge pressure Ps and the maximum load pressure Pamax at the respective same levels, so that the equal control force based on the differential pressure Ps−Pamax is applied to the two distribution compensating valves in the valve-opening direction. As with the first embodiment, therefore, the differential pressures across the flow control valve 5 and the flow control valve associated with the other actuator are controlled to become equal to each other. Consequently, the two actuators are supplied with flow rates distributed corresponding to relative ratios of the demanded flow rates (opening degrees) of the two flow control valves for enabling the proper combined operation of the boom and the other driven member.

In this connection, before the hydraulic pump 1 reaches the available maximum flow rate, the differential pressure Ps−Pamax and hence the control force Fc applied to the two flow control valves in the valve-opening direction are constant, so that the differential pressures across the flow control valve 5 and the flow control valve associated with the other actuator are each controlled to become constant. After the hydraulic pump 1 has reached the available maximum flow rate, the differential pressure Ps−Pamax is reduced and hence the control force applied to the two distribution compensating valves in the valve-opening direction is also reduced, whereby the differential pressures across the flow control valves are each reduced with a decrease in the differential pressure Ps−Pamax. Accordingly, even after the hydraulic pump 1 has reached the available maximum flow rate, the two actuators are supplied with the flow rates distributed properly for carrying out a smooth combined operation.

Next, when both the operation devices 19, 20 are operated simultaneously for carrying out the combined operation of swing and boom-up, the hydraulic pump 1 usually reaches the available maximum flow rate and undergoes saturation. Therefore, the differential pressure Ps−Pamax is reduced below a predetermined value, whereupon the control force based on the differential pressure Ps−Pamax thus reduced is applied to the distribution compensating valve 70, so that the differential pressure across the flow control valve 4 is reduced with a decrease in the differential pressure Ps−Pamax. In other words, since the swing motor 2 is the actuator on the higher load pressure side, the distribution compensating valve 70 is held at a substantially fully open position.

Meanwhile, at this time, the pilot pressure A1 or A2 for driving the flow control valve 4 associated with swing is applied to the selector valve 80 through the shuttle valve 81, thereby switching the selector valve 80 from a position as illustrated to another position. Accordingly, the drive part 75 of the distribution compensating valve 71 is communicated with the tank, causing the distribution compensating valve 71 to be subjected to the control force in the valve-opening direction based on only the pump discharge pressure Ps led to the drive part 74 thereof. Thus, the distribution compensating valve 71 is also held at a fully open position.

As a result of both the distribution compensating valves 70, 71 being held at a fully open position, the swing motor 2 and the boom cylinder 3 are brought into a condition equivalent to the case where they are connected in parallel. Like a general hydraulic circuit in which the swing motor and the boom cylinder are connected in parallel, therefore, the swing motor 2 is supplied with the hydraulic fluid so as to accelerate it gradually, while the remaining hydraulic fluid is supplied to the boom cylinder 3 as the actuator on the lower load pressure side, thereby permitting the combined operation of swing and boom-up in which the boom is raised up at a higher speed and the swing body is turned at a relatively moderate speed.

Accordingly, with this embodiment as well, during a combined operation including a different actuator than one of the swing body and the boom, it is possible to carry out a proper combined operation. In addition, during the combined operation of swing and boom-up, it becomes possible to ensure a sufficient lift extent of the boom cylinder 3 and hence good workability. Furthermore, the relief amount of hydraulic fluid is reduced during operation of the swing motor 2, and the amount of heat generated in the distribution compensating valve 71 is reduced, which contributes to suppressing the loss of energy.

THIRD EMBODIMENT

A third embodiment of the present invention will be described below with reference to FIGS. 6–8. In this embodiment, the valve of the type described in U.S. Pat. No. 4,535,809 is used as a flow control valve.

Figure 6:
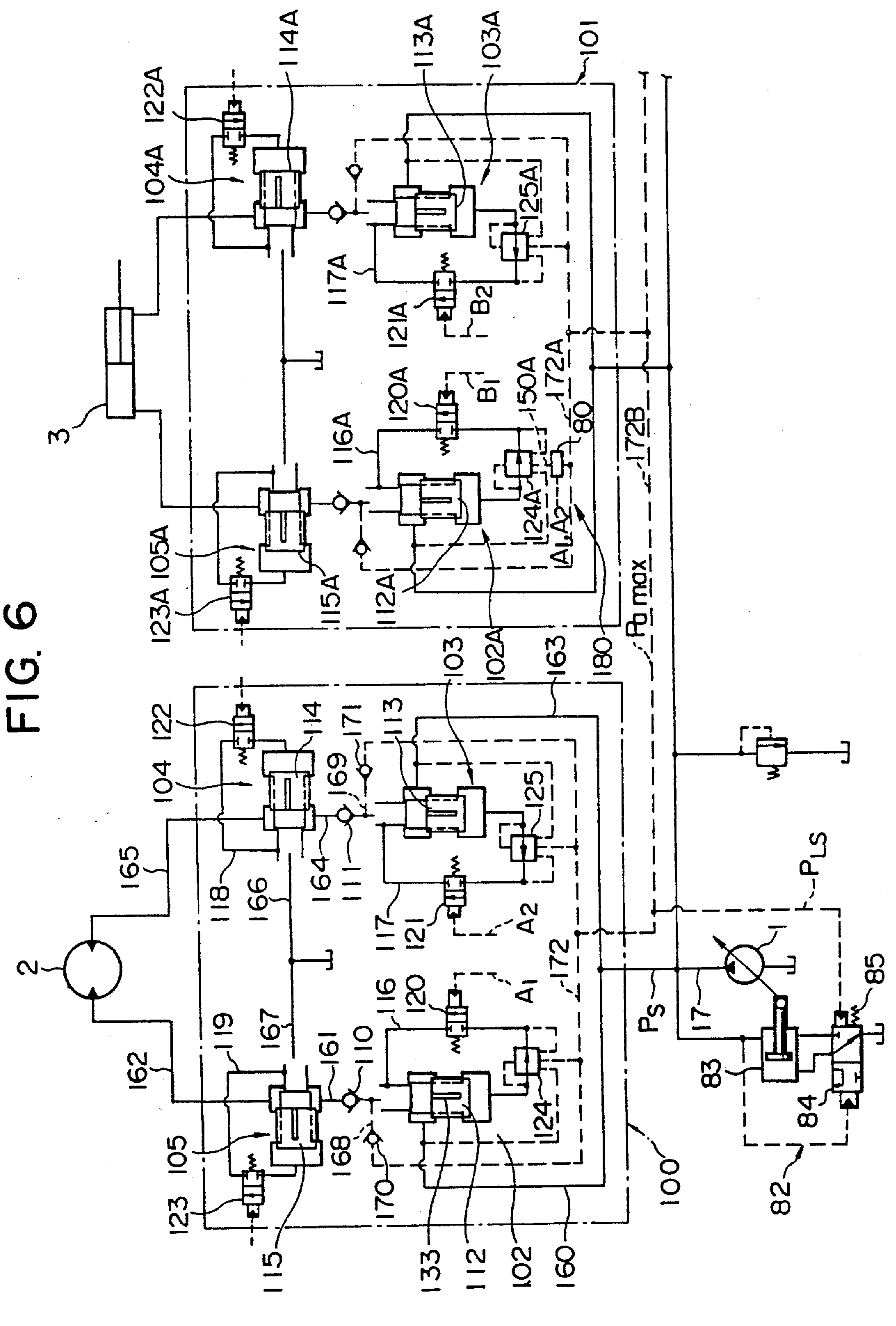
FIG. 6 is a circuit diagram of the hydraulic drive system according to a third embodiment of the present invention.
Figure 7:
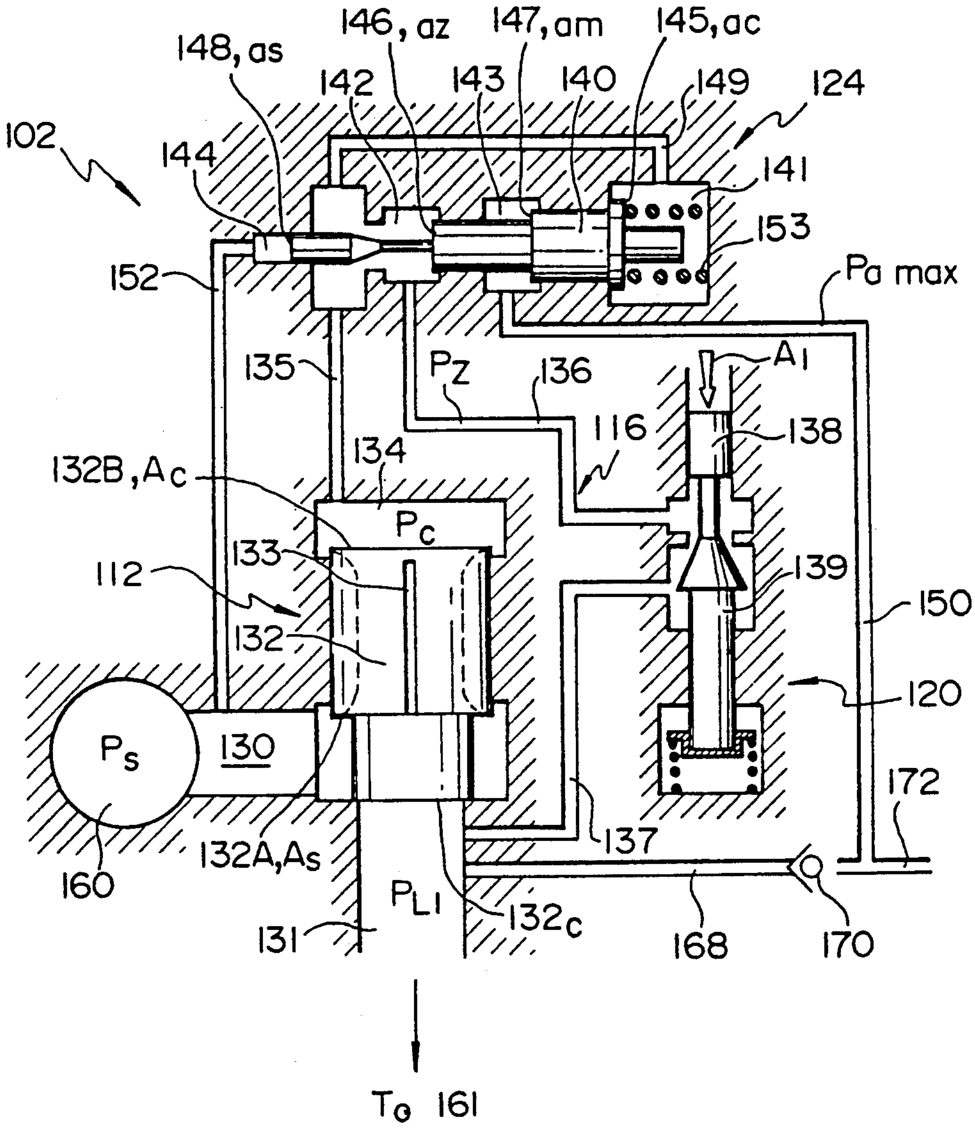
FIG. 7 is a detailed view of a first seat valve assembly.

Referring to FIG. 6, a flow control valve 100 for controlling flow of the hydraulic fluid supplied to a swing motor 2 and a flow control valve 101 for controlling flow of the hydraulic fluid supplied to a boom cylinder 3 comprise four, i.e., first through fourth, seat valve assemblies 102–105 and 102A–105A, respectively.

In the first flow control valve 100, the first seat valve assembly 102 is disposed in a meter-in circuit 160–162 serving as a main circuit when driving the swing motor 2 to rotate rightwards, for example, the second seat valve assembly 103 is disposed in a meter-in circuit 163–165 serving as a main circuit when driving the swing motor 2 to rotate leftwards, for example, the third seat valve assembly 104 is disposed in a meter-out circuit 165, 166 located between the swing motor 2 and the second seat valve assembly 103 and serving as a main circuit when driving the swing motor 2 to rotate rightwards, and the fourth seat valve assembly 105 is disposed in a meter-out circuit 162, 167 located between the swing motor 2 and the first seat valve assembly 102 and serving as a main circuit when driving the swing motor 2 to rotate leftwards.

A check valve 110 for preventing the hydraulic fluid from reversely flowing toward the first seat valve assembly 102 is disposed in a meter-in circuit line 161 between the first seat valve assembly 102 and the fourth seat valve assembly 105, whereas a check valve 111 for preventing the hydraulic fluid from reversely flowing toward the second seat valve assembly 103 is disposed in a meter-in circuit line 164 between the second seat valve assembly 103 and the fourth seat valve assembly 104. Further, load lines 168, 169 are connected to the upstream side of the check valve 110 in the meter-in circuit line 161 and the upstream side of the check valve 111 in the meter-in circuit line 164, respectively, and a common load line 172 is connected to the load lines 168, 169 through check valves 170, 171, respectively.

The second flow control valve 101 includes the first through fourth seat valve assemblies 102A–105A arranged in a like manner, and also has a load line 172A similar to the load line 172.

The two load lines 172, 172A are interconnected by a common load line 172B, and the highest load pressure among the plural actuators inclusive of the swing motor 2 and the boom cylinder 3 is introduced to the load lines 172, 172A, 172B for detecting the maximum load pressure.

In the first flow control valve 100, the first through fourth seat valve assemblies 102–105 comprise main valves 112–115 of the seat valve type, and pilot valves 120–123 disposed in corresponding pilot circuits. The first and second seat valve assemblies 102, 103 further include respective distribution compensating valves 124, 125 disposed upstream of the pilot valves 120, 121 in the pilot circuits, respectively.

The detailed structure of the first seat valve assembly 102 will now be described with reference to FIG. 7.

In the first seat valve assembly 102, the main valve 112 of the seat valve type has a valve body 132 for opening and closing an inlet port 130 and an output port 131. The valve body 132 is formed with a plurality of slits which jointly function as a variable restrictor 133 for changing its opening degree proportional to a position of the valve body 132, i.e., opening degree of the main valve. On the opposite side of the valve body 132 to the outlet port 131, there is defined a back pressure chamber 134 communicating with the inlet port 130 through the variable restrictor 133. Furthermore, the valve body 132 has a pressure receiving portion 132A which is subjected to the discharge pressure Ps of the hydraulic pump 1, a pressure receiving portion 132B which is subjected to the pressure in the back pressure chamber 134, i.e., back pressure Pc, and a pressure receiving portion 132C which is subjected to the outlet pressure PL1 of the main valve 112.

The pilot circuit 116 comprises pilot lines 135–137 for communicating the back pressure chamber 134 with the outlet port 131 of the main valve 112. The pilot valve 120 is driven by a pilot piston 138 and comprises a valve body 139 which constitutes a variable restrictor valve for opening and closing a passage between the pilot lines 136 and 137. The pilot piston 138 is driven with the pilot pressure A1 produced responsive to the operative displacement a control lever (not shown), for example.

The seat valve assembly thus constructed by combining the main valve 112 and the pilot valve 120 is known from U.S. Pat. No. 4,535,809. With that known construction, when the pilot valve 120 is operated, a pilot flow rate corresponding to the opening degree of the pilot valve 120 is created in the pilot circuit 116, allowing the main valve 112 to be opened to an opening degree proportional to the pilot flow rate under the action of the variable restrictor 133 and the back pressure chamber 134, so that a main flow rate amplified in proportion to the pilot flow rate is caused to flow from the inlet port 130 to the outlet port 131 through the main valve 112.

In this embodiment, the pilot circuit 116 further includes the distribution compensating valve 124. The distribution compensating valve 124 comprises a valve body 140 which constitutes a variable restrictor valve, a first drive chamber 141 for urging the valve body 140 in the valve-opening direction, and second, third and fourth drive chambers 142, 143, 144 positioned in opposite relation to the first drive chamber 141 for urging the valve body 140 in the valve-closing direction. The valve body 140 has first through fourth pressure receiving portions 145–148 corresponding to first through fourth drive chambers 141–144, respectively. The first drive chamber 141 is communicated with the back pressure chamber 134 of the main valve 112 through a pilot line 149 and the pilot line 135, the second drive chamber 142 is communicated with the pilot line 136, the third drive chamber 143 is communicated with the maximum load pressure line 172 through a pilot line 150, and the fourth drive chamber 144 is communicated with the inlet port 130 of the main valve 112 through a pilot line 152. With the above arrangement, the first receiving portion 145 is subjected to the pressure in the back pressure chamber 134, i.e., back pressure Pc, the second pressure receiving portion 146 is subjected to the inlet pressure Pz of the pilot valve 120, the third pressure receiving portion 147 is subjected to the maximum load pressure Pamax, and the fourth pressure receiving portion 148 is subjected to the discharge pressure Ps of the hydraulic pump 1.

Here, assuming that the first pressure receiving portion 145 has the pressure receiving area ac, the second pressure receiving portion 146 has the pressure receiving area az, the third pressure receiving portion 147 has the pressure receiving area am, the fourth pressure receiving portion 148 has the pressure receiving area as, and the pressure receiving portions 132A, 132B formed in the valve body 132 of the main valve 112 have the pressure receiving areas As, Ac, respectively, and that the ratio of As to Ac is given by $As/Ac=K$ ($K<1$), the pressure receiving areas ac, az, am, as are set to give relative ratios of $1:1-K:K(1-K):K^2$.

The detailed structure of the second seat valve assembly 103 is the same as that of the first seat valve assembly 102.

The detailed structure of the third and fourth seat valve assemblies 104, 105 is the same as that of the first seat valve assembly 102 except for omission of the distribution compensating valve 124 of the latter.

In the second flow control valve 101, the arrangements of the first through fourth seat valve assemblies 102A-105A are the same as that of the first through fourth seat valve assemblies 102-105 in the first flow control valve 100 except for the following. Incidentally, the components of the first through fourth seat valve assemblies 102A-105A are denoted in FIG. 6 by suffixing "A" to reference numerals denoting the corresponding components of the first through fourth seat valve assemblies 102-105 as required.

Figure 8:
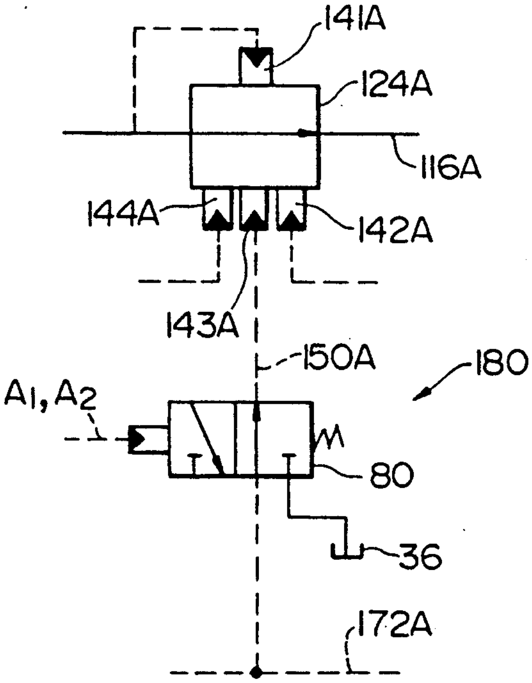
FIG. 8 is a detailed view of means for reducing the control force for a distribution compensating valve in a flow control valve associated with a boom cylinder.

In the first seat valve assembly 102A, as shown in FIG. 8 in large scale, a drive chamber 143A of a distribution compensating valve 124A is provided with control force reducer means 180. The control force reducer means 180 has a selector valve 80, similar to that of the above second embodiment, disposed in a hydraulic line 150A for introducing the maximum load pressure Pamax to the drive chamber 143A. The selector valve 80 is normally at a position as illustrated for introducing the maximum load pressure Pamax to the drive chamber 143A. When the pilot pressure A1 or A2 is applied for driving the pilot valve 120 or 121, the selector valve 80 is switched from the illustrated position so as to communicate the drive chamber 143A with a tank 36.

As with the second embodiment, a hydraulic pump 1 is provided with a pump regulator 82 for regulating the discharge pressure of the hydraulic pump 1 under load-sensing control.

Operation of this embodiment thus constructed will now be described.

First, based on the aforesaid relation of $As/Ac=K$ ($K<1$), the balance of forces acting on the valve body 132 of the main valve 112 in the first seat valve assembly 102 is expressed by:

$$Pc=KPs+(1-K)PL1 \quad (2)$$

On the other hand, since the pressure receiving area ac of the first pressure receiving portion 145 is 1, the pressure receiving area az of the second pressure receiving portion 146 is $1-K$, the pressure receiving area am of the third pressure receiving portion 147 is $K(1-K)$, and the pressure receiving area as of the fourth pressure receiving portion 148 is $K^2$. The balance of forces acting on the valve body 143 of the distribution compensating valve 124 is expressed by:

$$Pc=(1-K)Pz+K(1-K)Pamax+K^2Ps \quad (3)$$

From the Equations (2) and (3), a differential pressure $Pz-PL1$ between the inlet pressure and the outlet pressure of the plot valve 120 is obtained below:

$$Pz-PL1=K(Ps-Pamax) \quad (4)$$

The Equation (4) is that the distribution compensating valve 124 controls the differential pressure $Pz-PL1$ across the plot valve 120 to become coincident with $K(Ps-Pamax)$.

The distribution compensating valves 125, 125A of the seat valve assemblies 103, 103A, and the distribution compensating valve 124A of the seat valve assembly 102A when the selector valve 80 is not in operation, all function in a like manner to the above.

Meanwhile, when the selector valve 80 is switched upon application of the pilot pressure A1 or A2 in the seat valve assembly 102A, the pressure introduced to the drive chamber 143A of the distribution compensating valve 124A is reduced from the maximum load pressure Pamax to the tank pressure, so that the distribution compensating valve 124 is held at a fully open position.

Here, the term $Ps-Pamax$ in the right side of the Equation (4) is the differential pressure between the delivery pressure Ps of the hydraulic pump 1 and the maximum load pressure Pamax, as obtained under load-sensing control. Accordingly, the relation of the distribution compensating valves 124, 125, 124A, 125A with respect to the pilot valves 120, 121, 120A, 121A is essentially identical to the relation of the distribution compensating valves 70, 71 with respect to the flow control valves 4, 5 in the second embodiment. In the combined operation, the flow rates passing through the pilot valves 120, 121, 120A, 121A, i.e., the flow rates passing through the pilot circuits 116, 117, 116A, 117A, are controlled similarly to the flow rates passing through the flow control valves 4, 5 in the second embodiment.

On the other hand, because the flow rates passing through the main valves 112, 113, 112A, 113A are obtained by proportionally amplifying the flow rates passing through the pilot circuits 116, 117, 116A, 117A, respectively as stated above, the fact that the pilot flow rates are controlled similarly to the flow rates passing through the flow control valves 4, 5 in the second embodiment is equivalent to the fact that the flow rates passing through the main valves 112, 113, 112A, 113A are controlled similarly to the flow rates passing through the flow control valves 4, 5.

Therefore, this embodiment can also provide the advantageous effects of the second embodiment. More specifically, during a combined operation including an actuator other than one of the swing body and the boom, it is possible to carry out the proper combined operation. Further, during the combined operation of swing and boom-up, since the selector valve 80 is switched with the pilot pressure A1, A2 from the illustrated position so as to communicate the drive chamber 143A of the distribution compensating valve 124A with the tank pressure for holding the distribution compensating valve 124A at a fully open position, the swing motor 2 and the boom cylinder 3 are brought into a condition where they are connected practically in parallel, thereby making it possible to ensure sufficient lift of the boom cylinder 3 and hence good workability. In addition, the relief amount of hydraulic fluid is reduced during operation of the swing motor 2, and the amount of heat generated in the main valve 112A and the distribution compensating valve 124A is reduced, which contributes to suppressing the loss of energy.

The present applicant has also filed an application concerning an invention relating to a flow control valve, which comprises a seat valve assembly provided with a distribution compensating valve and a pilot circuit, as Japanese Patent Application No. 63-163646 on Jun. 30, 1988. The structure and arrangement of the distribution compensating valves 124, 125, 124A, 125A of the seat valve assemblies 102, 103, 102A, 103A in the above third embodiment can be modified variously in accordance with the teaching disclosed in the above-mentioned application. Anyway, it is necessary merely to arrange the selector valve such that at least one pilot pressure for urging the distribution compensating valve in the valve-closing direction is communicated with the tank pressure upon switching of the selector valve.

FOURTH EMBODIMENT

Figure 9:
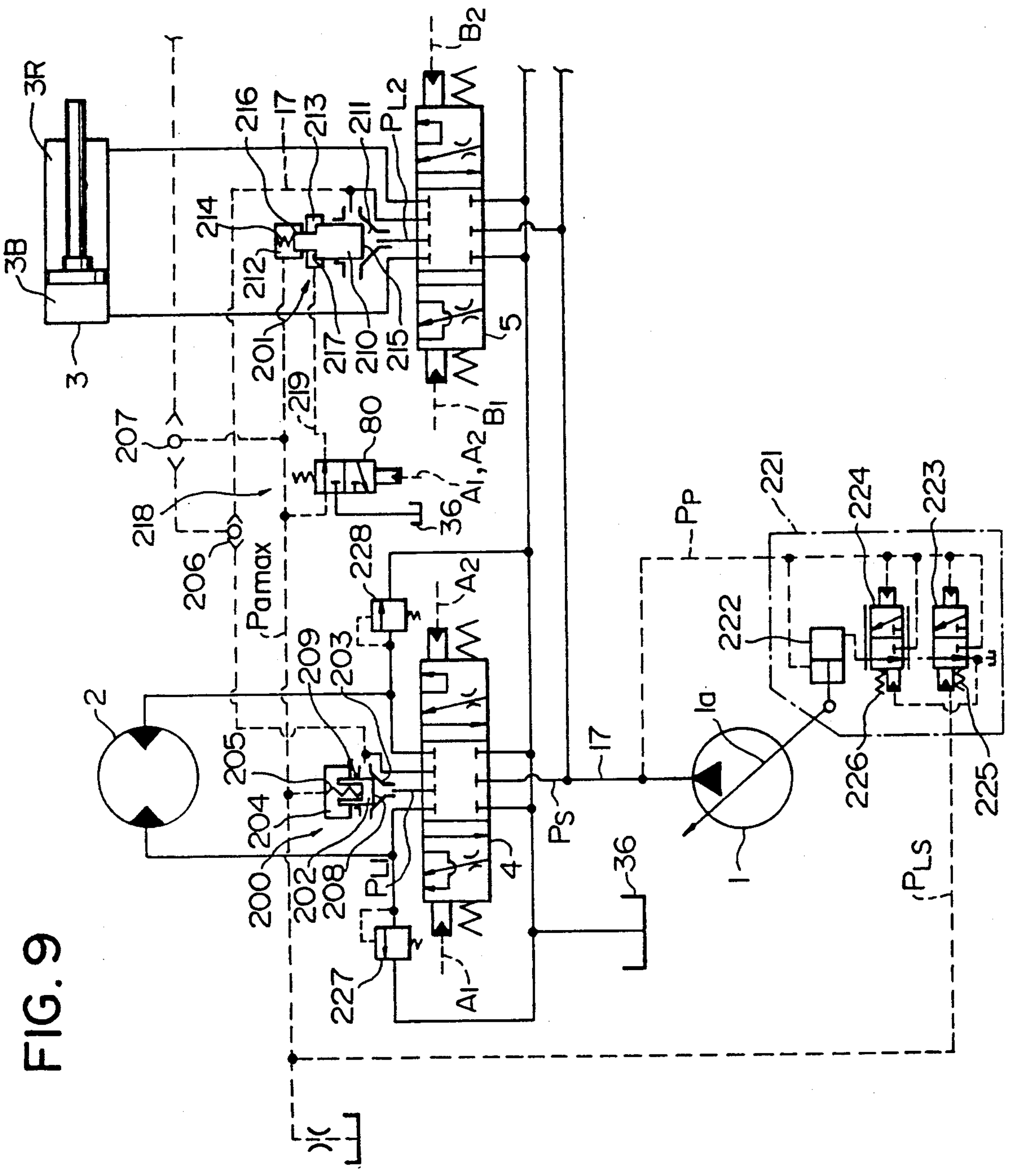
FIG. 9 is a circuit diagram of the hydraulic drive system according to a fourth embodiment of the present invention.

A fourth embodiment of the present invention will be described below with reference to FIG. 9. In FIG. 9, the identical components as those shown in FIG. 1 and so on are denoted by the same characters. Note that this embodiment employs a distribution compensating valve of the type described in U.S. Pat. No. 4,425,759, GB-A2, 195,745, JP-B2, 58-31486, etc.

Referring to FIG. 9, distribution compensating valves 200, 201 are disposed downstream of flow control valves 4, 5 associated with a swing motor 2 and a boom cylinder 3, respectively.

The distribution compensating valve 200 comprises a piston 202, a drive chamber 203 for urging the piston 202 in the valve-opening direction, a drive chamber 204 for urging the piston 202 in the valve-closing direction, and a spring 205 for slightly urging the piston 202 in the valve-closing direction. The drive chamber 203 is supplied with an outlet pressure PL1 of the flow control valve 4, and the drive chamber 204 is supplied with the maximum load pressure Pamax taken through shuttle valves 206, 207. The piston 202 has a first pressure receiving portion 208 facing the drive chamber 203 and a second pressure receiving portion 209 facing the drive chamber 203, the portions 208, 209 having the same area.

The distribution compensating valve 201 comprises a piston 210, a drive chamber 211 for urging the piston 210 in the valve-opening direction, two drive chambers 212, 213 for urging the piston 210 in the valve-closing direction, and a spring 214 for slightly urging the piston 210 in the valve-closing direction. The drive chamber 211 is supplied with an outlet pressure PL2 of the flow control valve 5, and the drive chambers 212, 213 are supplied with the maximum load pressure Pamax taken through the shuttle valves 206, 207. The piston 210 has a first pressure receiving portion 215 facing the drive chamber 211, a second pressure receiving portion 216 facing the drive chamber 212, and a third pressure receiving portion 217 facing the drive chamber 213. These three portions 215, 216, 217 are set such that the total area of the second and third pressure receiving portions 216, 217 is equal to the area of the first pressure receiving portion 215. As a result, the second pressure receiving portion 215 has a smaller area than the first pressure receiving portion 215.

The area ratio of the first pressure receiving portion 215 to the second pressure receiving portion 216 is determined in consideration of workability in the combined operation of the swing motor 2 and the boom cylinder 3, i.e., relative speed relation therebetween. In this embodiment, the area ratio of the first pressure receiving portion 215 to the second pressure receiving portion 216 is set to be 1:0.75 by way of example.

The drive chamber 213 of the distribution compensating valve 201 is provided with control force reducer means 218. The control force reducer means 218 has a selector valve 80 disposed in a hydraulic line 219 for introducing the maximum load pressure Pamax to the drive chamber 213. The selector valve 80 is operated in a pilot-type manner responsive to the pilot pressure A1 or A2 for driving the flow control valve 4 associated with the swing motor 2. In the absence of the pilot pressure A1 or A2, the selector valve 80 is at a position as illustrated for introducing the maximum load pressure Pamax to the driver chamber 213. Upon the pilot pressure A1 or A2 being applied, the selector valve 80 is switched from the illustrated position so as to communicate the drive chamber 213 with a tank 36.

The hydraulic pump 1 is provided with a pump regulator 221 which serves to control the pump discharge rate such that the discharge pressure Ps is held higher by a fixed value than the maximum load pressure Pamax, and restrict the displacement volume of the hydraulic pump 1 such that the input torque of the hydraulic pump 1 will not exceed a preset limit value.

The pump regulator 221 comprises a servo cylinder 222 for driving a swash plate of the hydraulic pump 1 and changing the displacement volume thereof, a first control valve 223 for adjusting a positional shift of the servo cylinder 222 to effect load-sensing control, and a second control valve 224 for limiting input torque.

The first control valve 223 has at its one end a drive part which is provided with a spring 225 and supplied with the maximum load pressure Pamax, and at its opposite end a drive part which is supplied with the pump discharge pressure Ps. When the maximum load pressure Pamax is raised up, the first control valve 223 is operated correspondingly to adjust a positional shift of the servo cylinder 222 for increasing the displacement volume of the hydraulic pump 1 and hence the discharge rate thereof. This enables to the discharge pressure Ps of the hydraulic pump 1 to be held constant at a higher level by a fixed value which is determined by the spring 225.

On the other hand, the second control valve 224 has at its one end a drive part which is provided with a spring 226 and supplied with the tank pressure, and at its opposite end a drive part which is supplied with the pump discharge pressure Ps. Though not shown, the spring 226 is positionally shifted responsive to a decrease in the inclined amount of a swash plate 1a of the hydraulic pump 1 for reducing a setting value. This permits the second control valve 224 to operate under the balance between the pump discharge pressure and the setting value of the spring 226, which value is reduced as the displacement volume of the hydraulic pump 1 increases, thereby restricting a positional shift of the servo cylinder 222 to limit the input torque of the hydraulic pump 1. As a result, a prime mover (not shown) for operating the hydraulic pump 1 is driven under horse-power limit control.

Relief valves 227, 228 are disposed in a hydraulic circuit of the swing motor 2.

Operation of this embodiment thus constructed will now be described.

When the swing body or the boom is solely operated, e.g., when an operator handles an operation device (not shown) for swing in an attempt to solely operate the swing body so that the pilot pressure A1 or A2, for example, the pilot pressure A1, is transmitted to the flow control valve 4, the flow control valve 4 is switched to a left-hand position as illustrated, and the hydraulic fluid from the hydraulic pump 1 flows into the drive chamber 203 of the distribution compensating valve 200 through a variable restrictor of the flow control valve 4. The hydraulic fluid flown into the drive chamber 203 acts on the first pressure receiving portion 208 of the piston 202, and then passes through the distribution compensating valve 200 while pushing up the piston 202 into a fully open position. Thereafter, the hydraulic fluid passes through the flow rate valve 4 again, and is then supplied to the swing motor 2 through a left-hand main line as illustrated. This causes the swing motor 2 to start swinging in one direction. At this time, because the swing body has very large inertia, the load pressure of the swing motor 2 is raised up to a setting pressure of the relief valve 227, and the surplus hydraulic fluid is drained to a tank 36. The load pressure is also introduced to the drive chamber 204 of the distribution compensating valve 200 to act on the second pressure receiving portion 209 of the piston 202, thereby urging the piston in the valve-closing direction.

Meanwhile, at this time, that load pressure is introduced, as the maximum load pressure Pamax, to the pump regulator 221, whereupon the discharge rate of the hydraulic pump 1 is controlled to hold the pump discharge pressure Ps higher by a fixed value than the maximum load pressure Pamax. Therefore, the piston 202 of the distribution compensating valve 200 is held at a fully open position against urging of the piston 202 caused by the load pressure in the valve-closing direction. This means that, ignoring the force of the spring 205, the pressure in the drive chamber 203, i.e., the outlet pressure PL1 of the flow control valve 4, becomes substantially equal to the load pressure. Accordingly, the differential pressure across the flow control valve 4 coincides with the differential pressure between the discharge pressure Ps and the maximum load pressure Pamax. Since that differential pressure is maintained constant under load-sensing control, the swing motor 2 is supplied with a flow rate corresponding to the opening degree of the flow control valve 4 irrespective of fluctuations in the load pressure.

Also when the boom cylinder 3 is operated solely, the selector valve 80 is at a position as illustrated and the load pressure is introduced to the drive chamber 213 as well, thereby carrying out the similar control to the above case of the swing motor 2.

When the boom and another driven member instead of the swing body are operated in a combined manner, the same maximum load pressure Pamax is introduced to the drive chambers 212, 213 of the distribution compensating valve 210 and a drive chamber, corresponding to the drive chamber 204, of a distribution compensating valve associated with another actuator (not shown), so that the pistons of those two distribution compensating valves are urged with the equal force in the valve-closing direction. Therefore, the piston of the distribution compensating valve associated with the actuator on the higher load pressure side is held at a fully open position as with the sole operation, whereas the piston of the distribution compensating valve associated with the actuator on the lower load pressure side is driven in the valve-closing direction, thereby controlling the outlet pressures of the flow control valves to be coincident with the maximum load pressure Pamax. In other words, the differential pressures across the two flow control valves are each controlled to be coincident with the differential pressure Ps−Pamax. Consequently, at any time before and after the hydraulic pump 1 reaches the available maximum flow rate under input torque limit control, the differential pressures across the two flow control valves are controlled to become equal to each other, so that the two actuators are supplied with flow rates distributed corresponding to relative ratios of the opening degrees of the two flow control valves for enabling the proper combined operation.

Next, when the swing body and the boom are operated in a combined manner, e.g., when the combined operation of swing and boom-up is performed, the swing motor 2 becomes the actuator on the higher load side, and the piston 202 of the distribution compensating valve 200 is held at a fully open position so that the differential pressure across the flow control valve 4 is controlled to be coincident with the differential pressure Ps−Pamax, as with the sole operation of the swing motor 2.

Meanwhile, at this time, the selector valve 80 is switched with the pilot pressure A1 or A2 so as to communicate the drive chamber 213 of the distribution compensating valve 71 with the tank 36. Therefore, the control force acting on the piston 210 in the valve-closing direction is given only by the pressure receiving portion 216 of the piston 210 due to the maximum load pressure Pamax applied to the drive chamber 212, whereby the pressure in the drive chamber 211 is reduced below the maximum load pressure Pamax because of an area difference between the pressure receiving portions 216 and 215. Thus, the differential pressure across the flow control valve 5 becomes larger than the differential pressure Ps−Pamax.

As a result of the differential pressure across the flow control valve 5 being controlled to be larger than the differential pressure across the flow control valve 4 as mentioned above, the boom cylinder 3 is supplied with a flow rate larger than would be the case if the discharge rate (available maximum flow rate) of the hydraulic pump 1 is distributed corresponding to relative ratios of the opening degrees of the flow control valves 4, 5, whereas the swing motor 2 is supplied with a flow rate smaller than that distributed corresponding to relative ratios of the opening degrees of the flow control valves 4, 5. As a consequence, the combined operation of swing and boom-up can be performed with certainty, while raising up the boom at a higher speed and turning the swing body at a relatively moderate speed.

The combined operation of swing and boom-up will now be explained by referring to a practical example including numerical values for the case of setting the area ratio of the first pressure receiving portion 215 to the second pressure receiving portion 216 to be 1:0.75.

Given a setting pressure of the relief valves 227, 228 being 280 bar, the load pressure of the swing motor 2 is raised up to the setting value of the relief valve 227 or 228, i.e., 280 bar. On the other hand, let it be assumed that the load pressure of the boom cylinder 3, as the actuator on the lower load pressure side, is 100 bar. The load pressure 280 bar on the higher pressure side is detected through the shuttle valves 206, 207. Assuming also that the spring 225 associated with the first control valve 223 of the pump regulator 221 has a setting value equivalent to 20 bar, the load pressure 280 bar is introduced to the pump regulator 221 and, therefore, the discharge pressure of the hydraulic pump 1 is given by a pressure resulted from summing the load pressure of 280 bar and 20 bar, i.e., 300 bar.

Here, in the distribution compensating valve 200 associated with the swing motor 2, the load pressure of 280 bar is introduced to the drive chamber 204, and the first and second pressure receiving portions 208, 209 have the same area, so that the pressure in the drive chamber 203 also becomes 280 bar. Thus, the flow control valve 4 has the inlet pressure of 300 bar and the outlet pressure of 280 bar, resulting in the differential pressure across the flow control valve 4 of 20 bar.

Meanwhile, in the distribution compensating valve 201 associated with the boom cylinder 3, the pressure in the drive chamber 212 is 280 bar, while the drive chamber 213 is under the tank pressure. Therefore, the pressure in the drive chamber 211 is reduced, in accordance with the area ratio 1:0.75 of the first pressure receiving portion 215 to the second pressure receiving portion 216, down to a pressure of 280 bar×0.75=210 bar. This makes the flow control valve 5 provide the inlet pressure of 300 bar and the outlet pressure 210 bar, resulting in the differential pressure across the flow control valve 5 of 90 bar. Stated otherwise, the differential pressure across the flow control valve 4 associated with the swing motor 2 is 20 bar, whereas the differential pressure across the flow control valve 5 associated with the boom cylinder 3 is increased to 90 bar.

Because the flow rate passing through the flow control valve is proportional to the square root of the differential pressure across the flow control valve (Bernoulli's theorem), the flow rate passing through the flow control valve 5 undergoing the differential pressure across the flow control valve 5 of 90 bar is 2.12 times the flow rate passing through the flow control valve 4 undergoing the differential pressure across the flow control valve 4 of 20 bar. Thus, the drive speed of the boom cylinder 3 becomes more than twice the conventional speed. On the other hand, as the flow rate supplied to the boom cylinder 3 increases, the flow rate supplied to the swing motor 2 decreases correspondingly, resulting in that the relief amount of hydraulic fluid through the relief valve 227 or 228 at start-up is reduced and so is the loss of energy. In addition, the loss of pressure caused at the distribution compensating valve 201 is given by 210 bar−100 bar=110 bar, which is remarkably smaller than would be the case if the first pressure receiving portion 215 and the second pressure receiving portion 216 have equal areas, i.e., 280 bar−100 bar=180 bar.

According to this embodiment, therefore, as with the foregoing embodiments, it is possible to carry out a proper combined operation during the combined operations of other than one of the swing body and the boom. Further, during the combined operation of swing and boom-up, it becomes possible to ensure good workability and suppress the loss of energy.

MODIFICATION OF FOURTH EMBODIMENT

Figure 10:
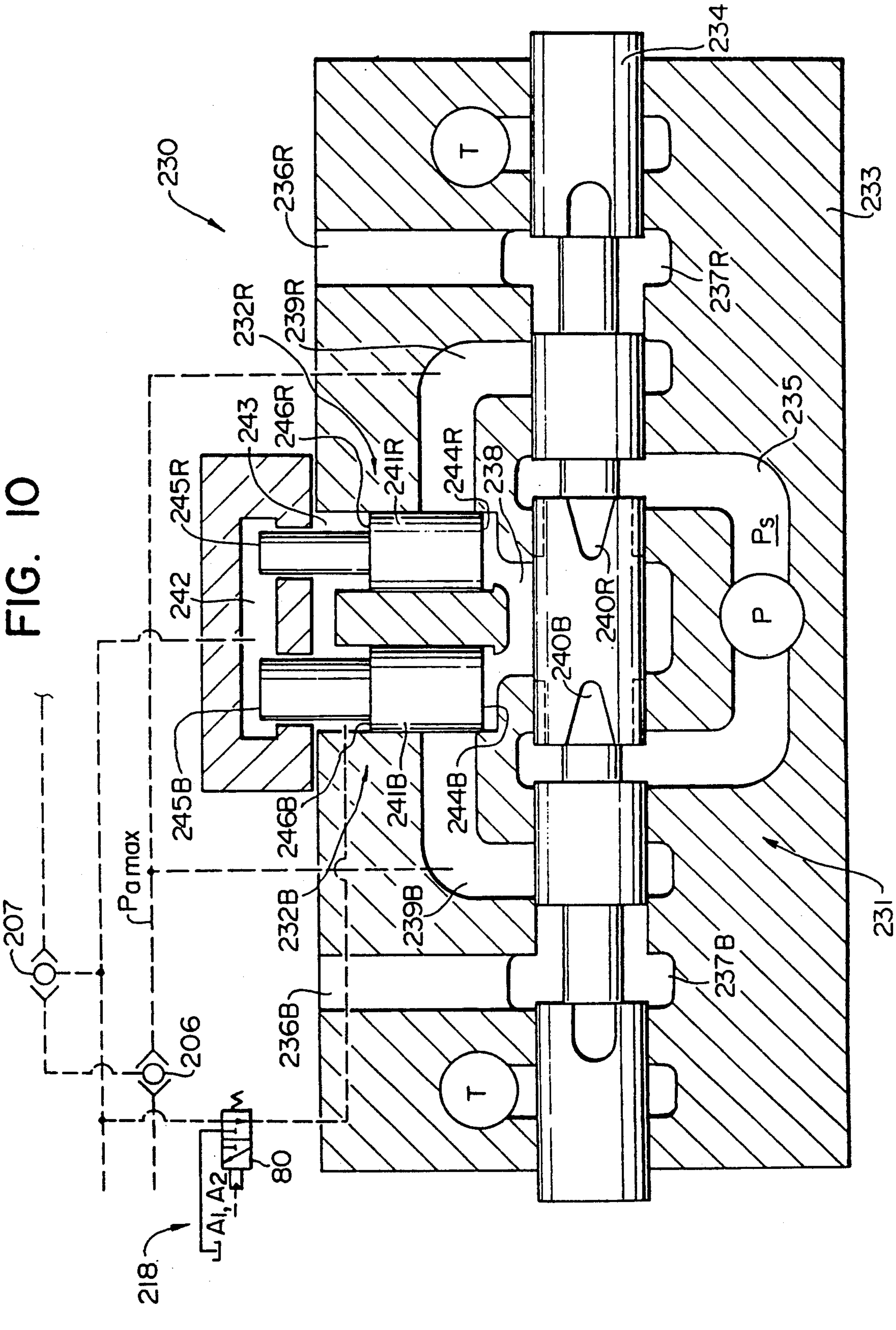
FIG. 10 is a sectional view of a valve device associated with the boom cylinder according to a modification of the fourth embodiment.

A modification of the fourth embodiment will be described below with reference to FIG. 10. In FIG. 10, the identical components to those shown in FIG. 9 are denoted by the same characters. Note that, in this modified embodiment, the flow control valve and the distribution compensating valve both associated with the boom cylinder 3 in the above embodiment are constructed into one piece, and the distribution compensating valve is constituted by two distribution compensating valves having different characteristics dependent on directions of supply of the hydraulic fluid to the boom cylinder 3.

Referring to FIG. 10, denoted by 230 is a valve device which includes a flow control valve 231 and two distribution compensating valves 232B, 232R constructed into one piece. The valve device 230 comprises a valve housing 233, and a spool 234 supported in the housing 233 to be axially reciprocated and serving as a valve body of the flow control valve 231. Applied to the opposite ends of the spool 234 are pilot pressures B1, B2.

The valve housing 233 is formed with a pump port P connected to the discharge line 17 (see FIG. 9) of the hydraulic pump 1, a chamber 235 communicating with the pump port P, ports 236B, 236R respectively connected to the bottom side 3B and the rod side 3R (see FIG. 9) of the boom cylinder 3, chambers 237B, 237R respectively connected to the ports 236B, 236R, a chamber 238 communicating between the flow control valve 231 and the distribution compensating valves 232B, 232R, passages 239B, 239R respectively communicating the chamber 238 with the chamber 237B and the chamber 238 with the chamber 237R, and tank ports T connected to the tank 36. Also formed in the spool 234 are notches which provide restrictor portions 240B, 240R.

The distribution compensating valves 232B, 232R comprise, respectively, stepped pistons 241B, 241R and common drive chambers 242, 243. The stepped pistons 241B, 241R have, respectively, first pressure receiving portions 244B, 244R facing the chamber 238 which serves as a first drive chamber, second pressure receiving portions 245B, 245R facing the drive chamber 242, and third pressure receiving portions 246B, 246R facing the drive chamber 243.

The first pressure receiving portion 244B of the stepped piston 241B and the first pressure receiving portion 244R of the stepped piston 241R have equal pressure receiving areas, whereas the second pressure receiving portions 245B, 245R are set such that the former is larger than the latter in the pressure receiving area. In other words, there is established the relationship of 241B=241R>245B>245R. As a result, the area ratio of the second pressure receiving portion 245B to the first pressure receiving portions 244B of the stepped piston 241B is larger than the area ratio of the second pressure receiving portion 245R to the first pressure receiving portions 244R of the stepped piston 241R. These area ratios are determined in consideration of workability to be achieved in the combined operation of swing and boom-up and the combined operation of swing and boom-down.

Directly introduced to the drive chamber 242 is the maximum load pressure Pamax, and introduced to the drive chamber 243 is the maximum load pressure Pamax through the selector valve 80.

Operation of the valve device 230 thus constructed will be described below.

When carrying out boom-up operation, the pilot pressure B1 is applied to the left end of the spool 234 for moving the spool 234 rightwards, as viewed on the drawing sheet. Thus, the hydraulic fluid in the chamber 235 flows into the chamber 238 through the restrictor portion 240B and pushes up the piston 241B of the distribution compensating valve 232B for being supplied to the bottom side 3B of the boom cylinder 3 through the passage 239B, the chamber 237B and the port 236B. On the other hand, the rightward movement of the spool 234 communicates the port 236R and the chamber 237R with the tank port T, so that the hydraulic fluid on the rod side 3B of the boom cylinder 3 is drained to the tank 36.

Further, the pressure in the passage 239B is introduced to a shuttle valve 206 and then applied, as the load pressure Pamax, to the drive chamber 242 during the sole operation of boom-up. During the combined operation inclusive of boom-up, the maximum load pressure Pamax taken out through the shuttle valves 206, 207 at that time is introduced to the drive chamber 242. Then, during the combined operation of swing and boom-up, the load pressure of the swing motor 2 is introduced thereto. The chamber 235 is supplied with the discharge pressure Ps of the hydraulic pump 1 regulated by the pump regulator 221 under load-sensing control.

In this connection, during the sole operation of boom-up, the selector valve 80 is at the illustrated position, as mentioned above, and the load pressure Pamax is introduced to the drive chamber 243 as well. As a result, the pressure in the chamber 238 becomes substantially equal to the load pressure Pamax, whereby the flow rate of hydraulic fluid passing through the restrictor portion 240B is controlled in accordance with the differential pressure across the restrictor portion 240B that is nearly equal to the differential pressure Ps−Pamax.

During the combined operation of swing and boom-up, the selector valve 80 is switched with the pilot pressure A1 or A2 so as to communicate the drive chamber 243 with the tank pressure. Therefore, the pressure in the chamber 238 becomes lower than the pressure Pamax in the drive chamber 242 by such an extent as corresponding to the area ratio of the second pressure receiving portion 245B to the first pressure receiving portions 244B of the stepped piston 241B, so that the differential pressure across the restrictor portion 240B is increased above the differential pressure Ps−Pamax. As a result, the flow rate passing through the flow control valve 231 becomes larger than that obtained during the sole operation, and hence the boom-up speed is increased.

Boom-down operation is essentially the same as the aforementioned boom-up operation. In the former case, however, the distribution compensating valve 232R is operated. Thus, the pressure in the chamber 238 during the combined operation of swing and boom-down becomes lower than that during the combined operation of swing and boom-up because of the aforesaid area ratios of the relevant pressure receiving portions, thereby permitting to lower the boom at a faster speed.

Incidentally, the stepped pistons 241B, 241R may each have the large-diameter portion and the small-diameter portion separate from each other.

With this embodiment, in addition to the advantageous effects of the foregoing embodiments, it is possible to set the boom-up and boom-down speeds separately during the combined operation of swing and boom-up or boom-down, and to further improve workability. The integral structure of the flow control valve and the distribution compensating valve(s) can reduce the entire size.

FIFTH EMBODIMENT

A fifth embodiment of the present invention will be described below with reference to FIGS. 11-16. In these figures, the identical components to those shown in FIG. 1 are denoted by the same characters.

Figure 11:
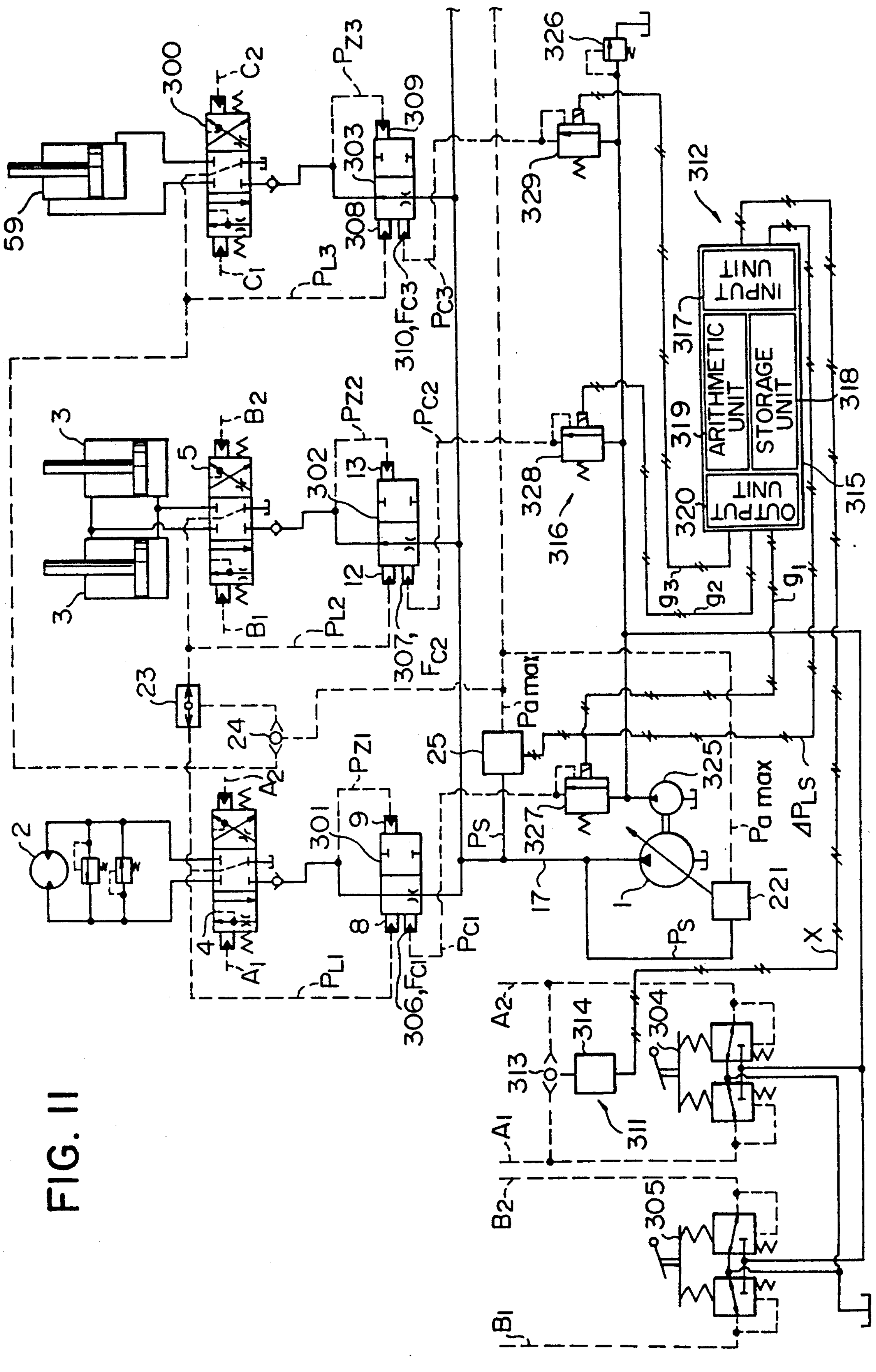
FIG. 11 is a circuit diagram of the hydraulic drive system according to a fifth embodiment of the present invention.
Figure 12:
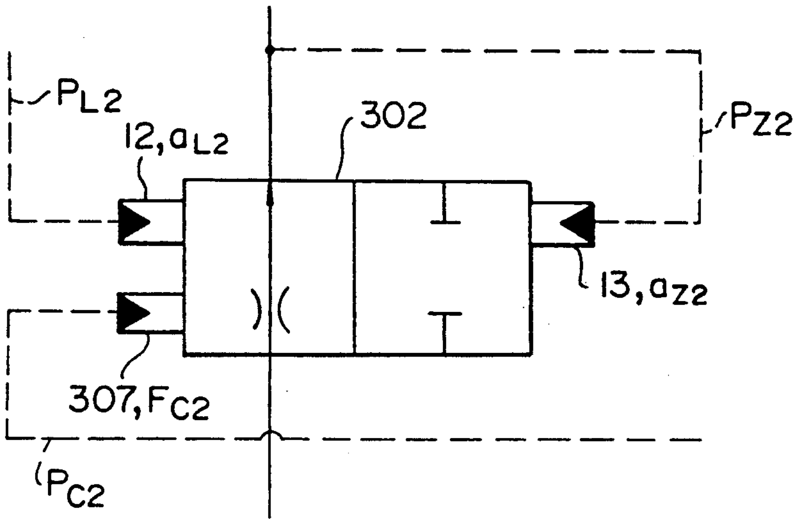
FIG. 12 is an enlarged view of the distribution compensating valve associated with the boom cylinder.

Referring to FIG. 11, as with the foregoing embodiments, a hydraulic drive system of this embodiment comprises a first actuator which undergoes a relatively high load pressure, e.g., a swing motor 2 for driving a swing body 52 (see FIG. 3), and a second actuator which undergoes a lower load pressure than that of the first actuator, e.g., a pair of a boom cylinder 3 for driving a boom 54 (see FIG. 3). As a third actuator separate from these first and second actuators, the hydraulic drive system further includes an arm cylinder 59 for driving an arm 55 (see FIG. 3), for example. These three actuators are supplied with a hydraulic fluid from a hydraulic pump 1 for being driven. In addition, the hydraulic drive system comprises a flow control valve 4 for controlling a flow rate of hydraulic fluid supplied to the swing motor 2, a flow control valve 5 for controlling a flow rate of hydraulic fluid supplied to the boom cylinder 3, a flow control valve 300 for controlling a flow rate of hydraulic fluid supplied to the arm cylinder 59, a distribution compensating valve 301 for controlling a differential pressure Pz1−PL1 across the flow control valve 4 for swing, a distribution compensating valve 302 (see FIG. 12) for controlling a differential pressure Pz2−PL2 across the flow control valves 4 for the boom, and a distribution compensating valve 303 for controlling a differential pressure Pz3−PL3 across the flow control valve 300 for the arm.

The flow control valves 4, 5, 300 are the pilot-operated type, in which the flow control valve 4 for swing is driven with a pilot pressure A1, A2 created upon operation of a pilot valve 304, the flow control valve 5 for the boom is driven with a pilot pressure B1, B2 created upon operation of a pilot valve 305, and the flow control valve 300 for the arm is driven with a pilot pressure C1, C2 created upon operation of a pilot valve (not shown).

The distribution compensating valve 301 has drive parts 8, 9 which are respectively supplied with an outlet pressure PL1 and an inlet pressure Pz1 of the flow control valve 4 for jointly applying a first control force to the distribution compensating valve 301 in the valve-closing direction based on the differential pressure Pz1−PL1 across the flow control valve 4, and a drive part 306 which is supplied with a control pressure Pc1 for applying a second control force Fc1, as a target value of the differential pressure Pz1−PL1 across the flow control valve 4, to the distribution compensating valve 301 in the valve-closing direction. Likewise, the distribution compensating valves 302 and 303 have respective drive parts 12, 13, 307 and 308, 309, 310 for applying thereto first control forces in the valve-closing direction based on the differential pressures Pz2−PL2 and Pz3−PL3 across the flow control valves 5, 300 and second control forces Fc1 and Fc2 in the valve-opening direction based on the control pressures Pc2 and Pc3, respectively.

This embodiment also includes drive detector means 311 for detecting drive of the second actuator, i.e., the swing motor 2, and control force generator means 312 for creating the aforesaid control pressures Pc1, Pc2, Pc3 and controlling the second control force Fc2 applied to the distribution compensating valve 302 associated with the boom cylinder 3 to be larger than the second control force Fc1 applied to the distribution compensating valve 301 associated with the swing motor 2, when start-up of drive of the swing motor 2 is detected by the drive detector means 311.

The drive detector means 311 comprises a shuttle valve 313 for taking out the pilot pressure A1 or A2 produced upon operation of the pilot valve 304, and a drive detecting sensor, e.g., pressure sensor 314, for outputting an electric signal dependent on the magnitude of the pilot pressure taken out through the shuttle valve 313.

The control force generator means 312 comprises a differential pressure sensor 25 for detecting a differential pressure between the pump pressure Ps and the maximum load pressure Pamax among load pressures of the actuators, i.e., load-sensing differential pressure Δ PLS (=Ps−Pamax), a controller 315 for receiving both an electric signal output from the differential sensor 25 indicative of the load-sensing differential pressure Δ PLS (which signal will hereinafter be referred to as Δ PLS for convenience) and an electric signal X output from the pressure sensor 314 and indicative of the swing operation, and then computing the aforesaid control forces Fc1, Fc2, Fc3, and control pressure generator means 316 for generating control pressures corresponding to the control forces Fc1, Fc2, Fc3 computed by the controller 315 and applied to the drive parts 306, 307, 310 of the distribution compensating valves 301, 302, 303, respectively.

The controller 315 comprises an input unit 317 to which the electric signals Δ PLS and X are input, a storage unit 318 for storing therein the functional relations between the electric signals Δ PLS and the control forces Fc1, Fc2, Fc3, an arithmetic unit 319 for reading the setting values stored in the storage unit 30 in accordance with the electric signals Δ PLS and X and for determining the control forces corresponding to the differential pressure Δ PLS, and an output unit 320 for outputting the control forces determined by the arithmetic unit 319 in the form of the electric signals g1, g2, g3.

Figure 13:
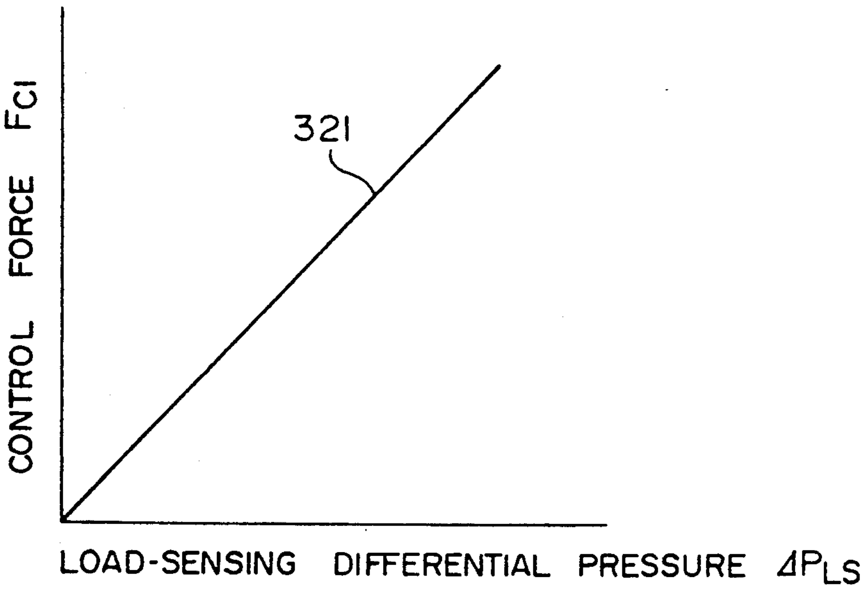
FIG. 13 is a graph showing the functional relation between a load-sensing differential pressure Δ PLS and a control force Fc1 for a distribution compensating valve associated with a swing motor to be set in the controller.
Figure 14:
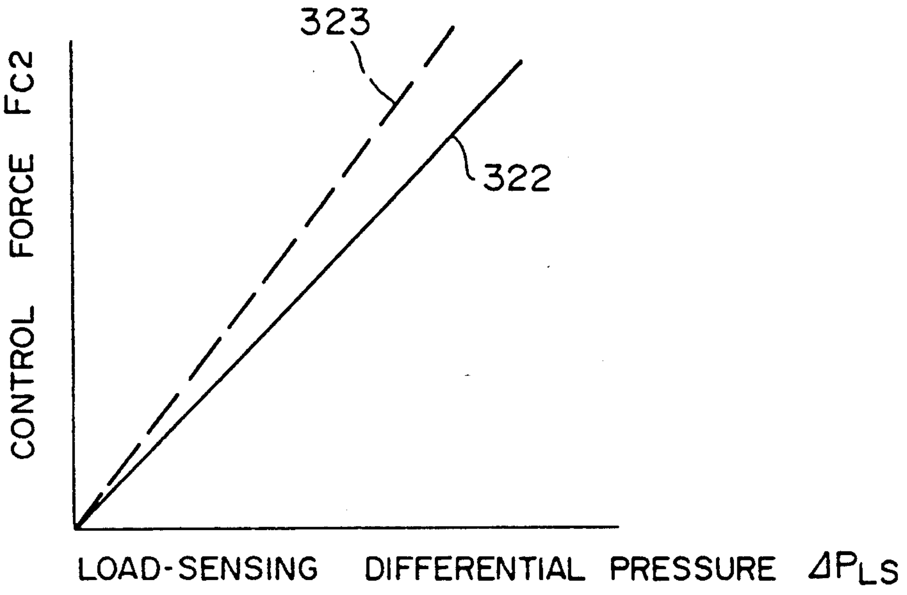
FIG. 14 is a graph showing the functional relation between the load-sensing differential pressure Δ PLS and a control force Fc2 for the distribution compensating valve associated with the boom cylinder to be set in the controller.
Figure 15:
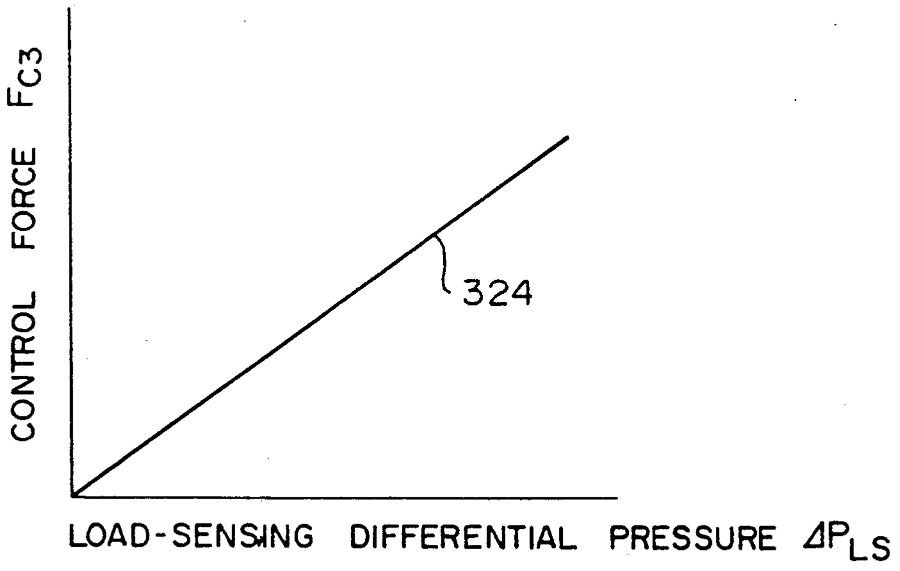
FIG. 15 is a graph showing the functional relation between the load-sensing differential pressure Δ PLS and a control force Fc3 for a distribution compensating valve associated with an arm cylinder to be set in the controller.

The functional relations between the load-sensing differential pressure Δ PLS and the control forces Fc1, Fc2, Fc3 stored in the storage unit 318 are as plotted in FIGS. 13–15, respectively. More specifically, FIG. 13 shows the functional relation for the distribution compensating valve 301 associated with the flow control valve 4 for swing in which, as indicated by a characteristic line 321, the control force Fc1 applied by the drive part 306 of the distribution compensating valve 301 is increased gradually with increase in the load-sensing differential pressure Δ PLS.

FIG. 14 shows the functional relation for the distribution compensating valve 302 associated with the flow control valve 5 for the boom in which, as indicated by characteristic lines 322, 323, there exist two types of functional relations. With either of the characteristic lines 322, 323, the control force Fc2 applied by the drive part 307 of the distribution compensating valve 302 is increased with increase in the load-sensing differential pressure Δ PLS. However, the characteristic line 323 is set to have a larger slope than the characteristic line 322. The characteristic line 322 indicates the first functional relation corresponding to the combined operations other than the combined operation of the swing body and the boom. The characteristic line 323 indicates the second functional relation corresponding to the combined operation of the swing body and the boom.

Further, FIG. 15 shows the functional relation for the distribution compensating valve 303 associated with the flow control valve 300 for the arm in which, as indicated by a characteristic line 324, the control force Fc3 applied by the drive part 310 of the distribution compensating valve 303 is increased gradually with increase in the load-sensing differential pressure Δ PLS.

Returning to FIG. 11, the control pressure generator means 316 comprises a pilot hydraulic source, i.e., pilot pump 325, driven in synchronism with the hydraulic pump 1, a relief valve 326 for setting a pilot pressure of the pilot pump 325, a solenoid proportional valve 327 for converting the pilot pressure of the pilot pump 325 to the control pressure Pc1 in response to the electric signal g1 from the controller 315 and for applying the control pressure Pc1 to the drive part 306 of the distribution compensating valve 301, a solenoid proportional valve 328 for converting the pilot pressure of the pilot pump 325 to the control pressure Pc2 in response to the electric signal g2 from the controller 315 and for applying the control pressure Pc2 to the drive part 307 of the distribution compensating valve 302, and a solenoid proportional valve 329 for converting the pilot pressure of the pilot pump 325 to the control pressure Pc3 in response to the electric signal g3 from the controller 315 and for applying the control pressure Pc3 to the drive part 310 of the distribution compensating valve 303.

As with the fourth embodiment shown in FIG. 9, the hydraulic pump 1 is provided with a pump regulator 221 which serves to regulate the pump discharge rate under load-sensing control such that the discharge pressure Ps is held higher by a fixed value than the maximum load pressure Pamax, and to perform input torque limiting control such that the displacement volume of the hydraulic pump 1 is restricted to keep the input torque of the hydraulic pump 1 from exceeding a preset limit value.

This embodiment thus constructed is operated as follows.

Figure 16:
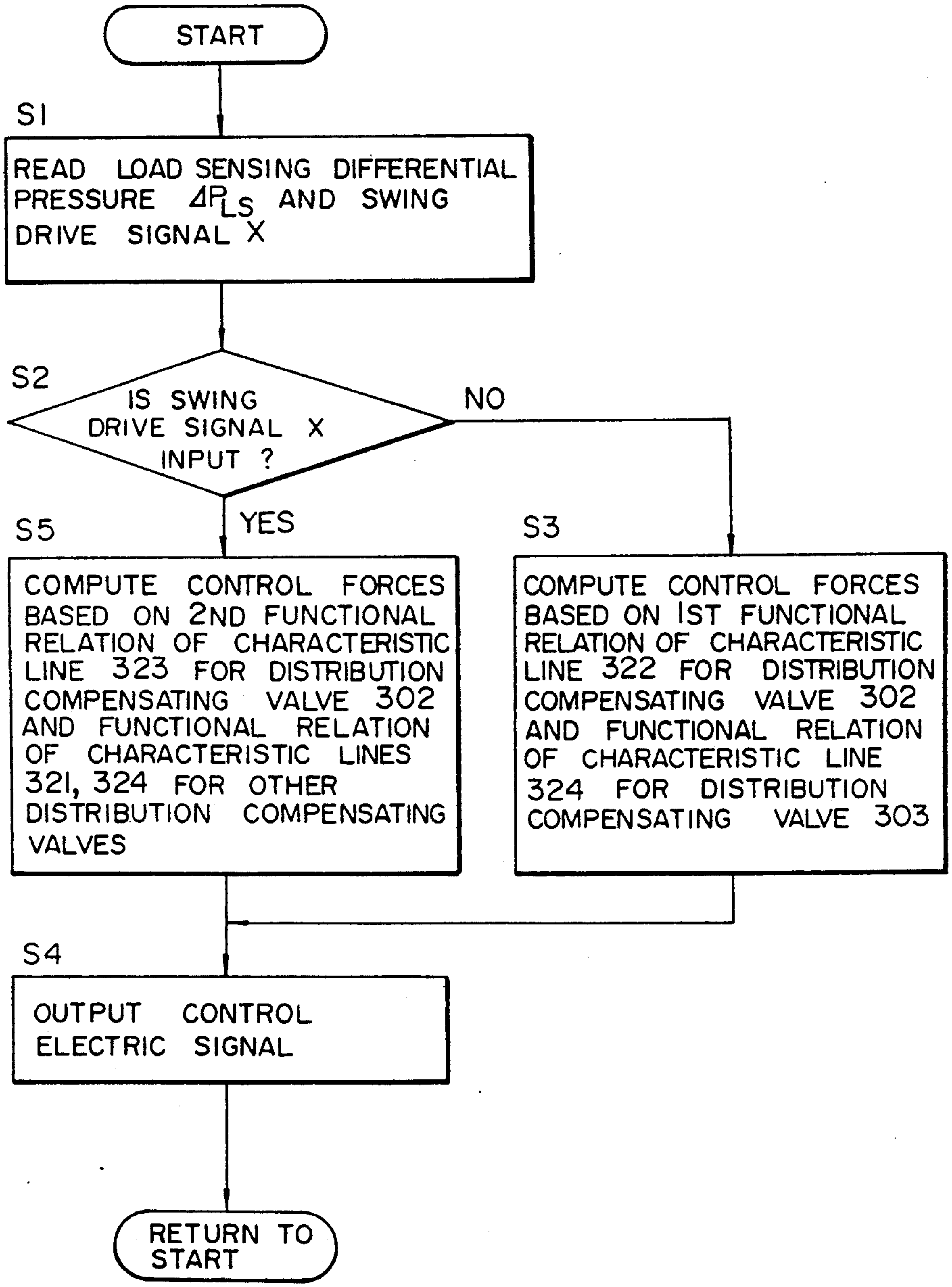
FIG. 16 is a flowchart showing the control process implemented by the controller.

When the pilot valve 305 associated with the boom cylinder 3 and the pilot valve (not shown) associated with the arm cylinder 59 are operated so that the flow control valve 5 for the boom and the flow control valve 300 for the arm are brought into operation appropriately in an attempt to dig earth, for example, the arithmetic unit 319 of the controller 315 carries out the control process according to the sequence shown in FIG. 16.

First, in step S1, the load-sensing differential pressure Δ PLS detected by the differential pressure sensor 25 and the swing drive signal X detected by the pressure sensor 14 are read into the arithmetic unit 319 through the input unit 317 of the controller 315. The control goes to step S2 which determines whether the swing drive signal X is input to the arithmetic unit 319. Now, since the swing operation is not intended and no swing drive signal X is input, the determination in step S2 is NO and the control goes to step S3.

In step S3, based on the setting values stored in the storage unit 318, both the first functional relation of the characteristic line 322 of FIG. 14 associated with the distribution compensating valve 302 and the functional relation of the characteristic line 324 of FIG. 15 associated with the distribution compensating valve 303 are read into the arithmetic unit 319 to compute the control forces Fc2, Fc3 corresponding to the load-sensing differential pressure Δ PLS, followed by going to step S4.

In step S4, the electric signals g2, g3 corresponding to the control forces Fc2, Fc3 obtained by step S3 are delivered from the output unit 320 to the drive parts of the solenoid proportional valves 328, 329, respectively. Thus, the solenoid proportional valves 328, 329 are operated to convert the pilot pressure of the pilot pump 325 to the control pressures Pc2, Pc3 which are applied to the drive parts 307, 310 of the distribution compensating valves 302, 303, respectively. This applies the control forces Fc2, Fc3 to the distribution compensating valves 302, 303 in the valve-opening direction for properly adjusting the opening degrees of the distribution compensating valves 302, 303. As a result, the hydraulic fluid of the hydraulic pump 1 is supplied to the boom cylinder 3 through the distribution compensating valve 302 and the flow control valve 5 and, at the same time, to the arm cylinder 59 through the distribution compensating valve 303 and the flow control valve 300, thereby permitting to carry out the digging work with simultaneous drive of the boom cylinder 3 and the arm cylinder 59, i.e., combined operation of the boom and the arm.

Under the balance among the forces acting on the distribution compensating valve 302 associated with the boom cylinder 3 during the combined operation of the boom and the arm, the following equation is established;

$$PL2 \cdot aL2 + Fc2 = Pz2 \cdot aZ2 \quad (5)$$

assuming that the drive parts 12, 13 have their pressure receiving areas aL2, aZ2, respectively. Here, given the proportional constant of the characteristic line 322 indicating the first functional relation in FIG. 14 being α 1, there is obtained the relationship of Fc2=α 1 1·Δ PLS. Accordingly, with setting of aL2=aZ2, the differential pressure Pz2−PL2 across the flow control valve 5 is expressed by:

$$Pz2 - PL2 = (\alpha 1/aL2)\Delta PLS \quad (6)$$

Under the balance among the forces acting on the distribution compensating valve 303 associated with the arm cylinder 59, the following equation is established:

$$PL3 \cdot aL3 + Fc3 = Pz3 \cdot aZ3 \quad (7)$$

assuming that the drive parts 308, 309 have their pressure receiving areas aL3, aZ3, respectively. Here, given the proportional constant of the characteristic line 324 in FIG. 15 being β, there is obtained the relationship of Fc3=β·Δ PLS. Accordingly, with setting of aL3=aZ3=aL2, the differential pressure Pz3−PL3 across the flow control valve 300 is expressed by:

$$Pz2 - PL2 = (\beta/aL2)\Delta PLS \quad (8(8)$$

Meanwhile, there exists generally the relationship below among a flow rate Q passing through a flow control valve, a differential pressure Δ P across the flow control valve and the opening area A of the flow control valve:

$$Q = K \cdot A\sqrt{\Delta P} \quad (9)$$

assuming that the proportional constant is K. Therefore, let it be assumed that the flow rate passing through the flow control valve 5 for the boom is Q1, the opening area thereof at the full stroke is A1, and the proportional constant is K1, then $$Q1 = K1 \cdot A1\sqrt{(\alpha 1/aL2)\,\Delta PLS} \quad (10)$$

is obtained from the Equation (6). Likewise, let it be assumed that the flow rate passing through the flow control valve 300 for the arm is Q2, the opening area thereof at the full stroke is A2, and the proportional constant is K1, then $$Q2 = K2 \cdot A2\sqrt{(\beta/aL2)\,\Delta PLS} \quad (11)$$

is obtained from the Equation (8). From the Equations (10) and (11), the distributed ratio Q1/Q2 of the flow rate supplied to the boom cylinder 3 to the flow rate supplied to the arm cylinder 59 is given by:

$$Q1/Q2 = K1 \cdot A1\sqrt{\alpha 1}\;/K2 \cdot A2\sqrt{\beta} \quad (12)$$

Here, K1, A1, α 1, K2, A2 and β are constants and hence the distributed ratio Q1/Q2 becomes constant. Stated otherwise, in this embodiment as well, the flow rate of the hydraulic pump 1 is distributed to the respective actuators at fixed ratios during simultaneous drive of the boom cylinder 3 and the arm cylinder 59, without being mutually affected by fluctuations in the load pressure of the other actuator. As a result, there can be achieved the combined operation in which the boom cylinder 3 and the arm cylinder 59 are simultaneously driven in accordance with the operated amounts, i.e., opening areas, of the flow control valves 5, 300, respectively.

Furthermore, when the pilot valve 304 and the pilot valve 305 are operated so that the flow control valve 5 for the boom and the flow control valve 4 for swing are brought into operation in an attempt to load the dug earth onto trucks or the like, for example, the swing drive signal X from the pressure sensor 315 is read into the arithmetic unit 319 of the controller 315 through the input unit 317. Thus, the determination of step S2 in FIG. 16 is YES, and the control goes to step S5. In step S5, the arithmetic unit 319 carries out an operation to compute the control forces Fc1, Fc2 for the distribution compensating valve 301 associated with the swing motor 2 based on the functional relation indicated by the characteristic line 321 of FIG. 13 and for the distribution compensating valve 302 associated with the boom cylinder 3 based on the second functional relation indicated by the characteristic line 323 of FIG. 14, respectively.

The control goes to step S4 where the electric signals g1 corresponding to the control force Fc1 obtained by step S5 is delivered from the output unit 320 to the drive part of the solenoid proportional valve 327, and the electric signals g2 corresponding to the control force Fc2 is delivered from the output unit 320 to the drive part of the solenoid proportional valve 328. Thus, the solenoid proportional valves 327, 328 shown in FIG. 11 are operated to convert the pilot pressure of the pilot pump 325 to the control pressures Pc1, Pc2, which are applied to the drive parts 306, 307 of the distribution compensating valves 301, 302, respectively. This applies the control forces Fc1, Fc2 to the distribution compensating valves 301, 302 in the valve-opening direction for properly adjusting the opening degrees of the distribution compensating valves 301, 302. As a result, the hydraulic fluid of the hydraulic pump 1 is supplied to the swing motor 2 through the distribution compensating valve 301 and the flow control valve 4 and, at the same time, to the boom cylinder 3 through the distribution compensating valve 302 and the flow control valve 5, thereby permitting to carry out the work of loading the dug earth onto trucks or the like with simultaneous drive of the swing motor 2 and the boom cylinder 3, i.e., combined operation of the swing body and boom.

The balance among the forces acting on the distribution compensating valve 302 associated with the boom cylinder 3 during the combined operation of the swing body and the boom is expressed by the above Equation (5). Here, given the proportional constant of the characteristic line 323 indicating the second functional relation in FIG. 14 being $\alpha$ 2 ($>\alpha$ 1), there is obtained the relationship of $Fc2=\alpha\,2\cdot\Delta$ PLS. In this case, the differential pressure $Pz2-PL2$ across the flow control valve 5 is expressed by:

$$Pz2-PL2=(\alpha 2/aL2)\Delta PLS \quad (13)$$

Under the balance among the forces acting on the distribution compensating valve 301 associated with the swing motor 2, the following equation is established;

$$PL1\cdot aL1+Fc1=Pz1\cdot aZ1 \quad (14)$$

assuming that the drive parts 8, 9 have their pressure receiving areas aL1, aZ1, respectively. Here, given the proportional constant of the characteristic line 321 in FIG. 13 being $\gamma$, there is obtained the relationship of $Fc1=\gamma\cdot\Delta$ PLS. Accordingly, with setting of $aL1=aZ1=aL2$, the differential pressure $Pz1-PL1$ across the flow control valve 4 is expressed by:

$$Pz1-PL1=(\gamma/aL2)\Delta PLS \quad (15)$$

From the Equations (10) and (11), the flow rate Q1 passing through the flow control valve 5 is given by:

$$Q1 = K1\cdot A1\sqrt{(\alpha 2/aL2)\,\Delta PLS} \quad (16)$$

Likewise, let it be assumed that the flow rate passing through the flow control valve 4 for swing is Q3, the opening area thereof at the full stroke is A3, and the proportional constant is K3, $$Q3 = K3\cdot A3\sqrt{(\gamma/aL2)\,\Delta PLS} \quad (17)$$

is obtained from the Equation (15). Here, K1, A1, $\alpha$ 2, K3, A3 and $\gamma$ are constants and hence the distributed ratio Q1/Q3 becomes constant. Stated otherwise, the flow rate of the hydraulic pump 1 is distributed to the respective actuators at fixed ratios during simultaneous drive of the swing motor 2 and the boom cylinder 3 as well, without being mutually affected by fluctuations in the load pressure of the other actuator. As a result, there can be achieved the combined operation in which the swing motor 2 and the boom cylinder 3 are simultaneously driven in accordance with the operated amounts, i.e., opening areas, of the flow control valves 4, 5, respectively.

With this embodiment thus constructed, as described above, when the boom and the arm are operated in a combined manner, i.e., during simultaneous drive of the boom cylinder 3 and the arm cylinder 59, the boom cylinder 3 is supplied with the relatively small flow rate Q1 given by the Equation (10) corresponding to the proportional constant $\alpha$ 1 of a relatively small value based on the characteristic line 322 of FIG. 14, while the arm cylinder 59 is supplied with the sufficiently large flow rate Q2 corresponding to the proportional constant $\beta$ given by the characteristic line 324 of FIG. 15. Therefore, the flow rate is prevented from being excessively supplied to the boom cylinder 3, and this permits to achieve good combined operation without lowering the arm speed.

Furthermore, when the swing body and the boom are operated in a combined manner, i.e., during simultaneous drive of the swing motor 2 and the boom cylinder 3, the boom cylinder 3 is supplied with the relatively large flow rate Q1 given by the Equation (16) corresponding to the proportional constant $\alpha 2$ of a relatively large value based on the characteristic line 323 of FIG. 14, making it possible to sufficiently ensure the operating range of the boom cylinder 3. The swing motor 2 is supplied with the flow rate given by the Equation (17) corresponding to the proportional constant $\gamma$ based on the characteristic line 321 of FIG. 13. This permits to drive the swing motor 2, while allowing the larger flow rate to be passed to the boom cylinder 3. Consequently, it becomes possible to reduce the flow rate uselessly drained into the tank and suppress the loss of energy.

MODIFICATIONS OF FIFTH EMBODIMENT

Figure 17:
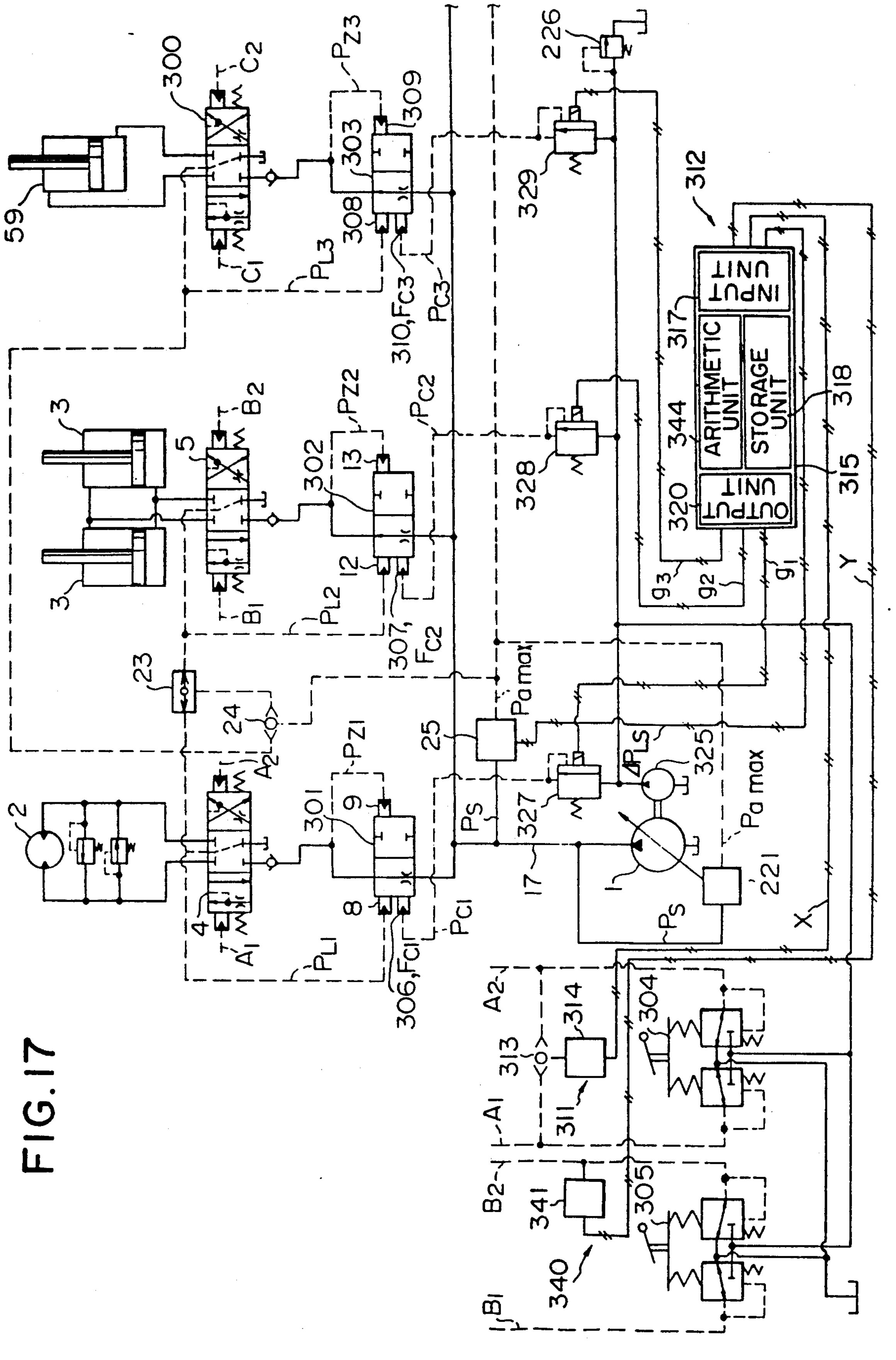
FIG. 17 is a circuit diagram of the hydraulic drive system according to a modification of the fifth embodiment.

A modification of the fifth embodiment will be described below with reference to FIG. 17. In FIG. 17, the identical components to those shown in FIG. 11 are denoted by the same characters.

This modified embodiment has, in addition to the drive detector means 311 for detecting drive of the swing motor 2, drive detector means 340 for detecting drive of the boom cylinder 3 to carry out the boom-up operation. The drive detector means 340 comprises a pressure sensor 341 for detecting the pilot pressure B2 applied to drive the flow control valve 5 to a right-hand position as viewed on the drawing sheet, and then for outputting an electric signal Y dependent on the magnitude of the pilot pressure B2. A control force generator means 342 carries out the operation shown in step S5 of FIG. 16 in an arithmetic unit 344 of the controller 343, only when the electrical signal X output from the pressure sensor 314 and indicative of the swing operation and the electrical signal Y output from the pressure sensor 341 and indicative of the boom-up operation are both input thereto. The remaining construction is the same as that of the above embodiment shown in FIG. 11.

This modified embodiment thus constructed permits to supply the relatively large flow rate to the boom cylinder 3 only during the combined operation of swing and boom-up, with the result that the work of loading the dug earth onto trucks or the like can be performed with more certainty and improved working efficiency.

Figure 18:
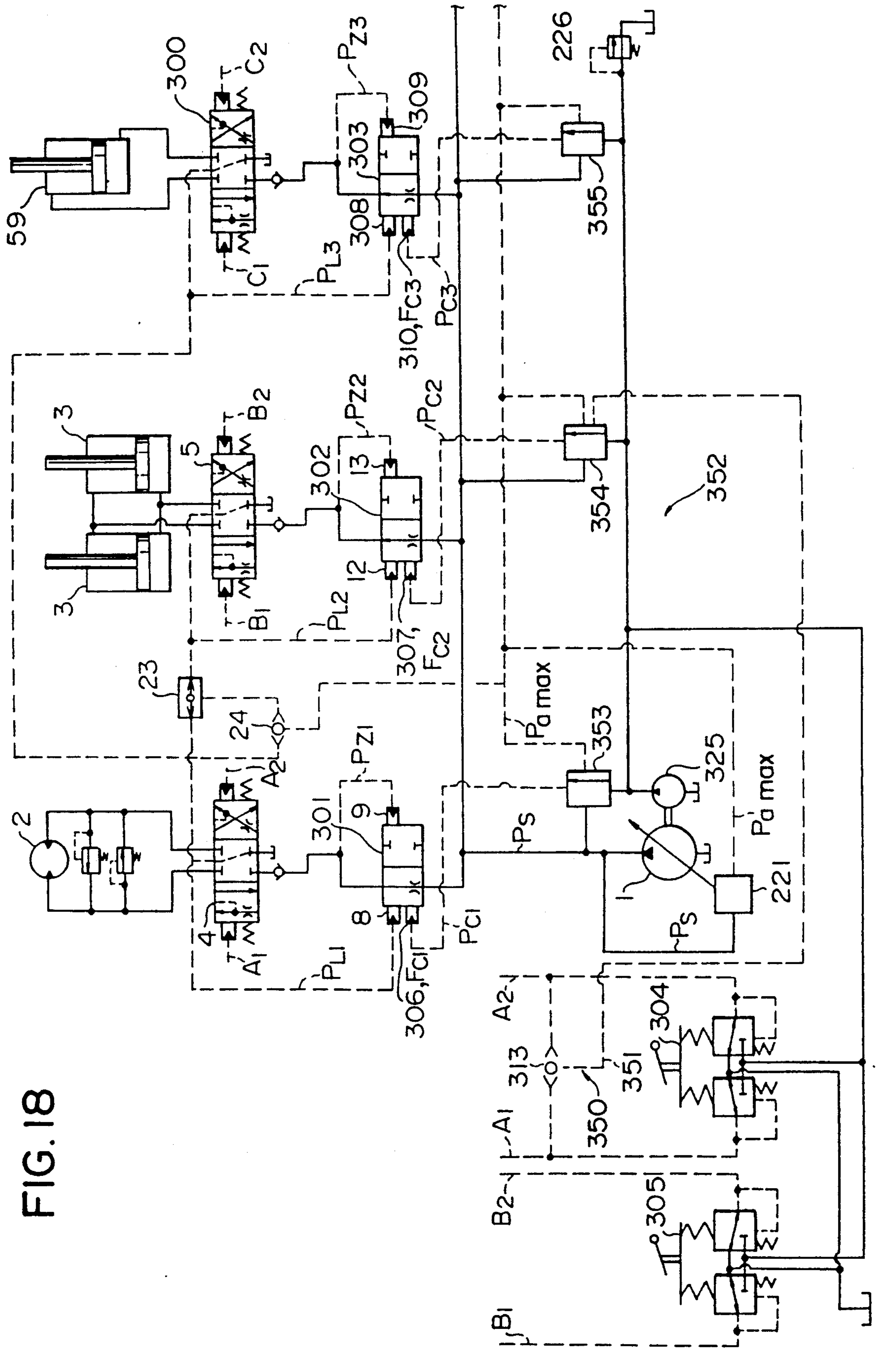
FIG. 18 is a circuit diagram of the hydraulic drive system according to another modification of the fifth embodiment.

Another modification of the fifth embodiment will now be described with reference to FIG. 18.

In this modified embodiment, drive detector means 350 for detecting drive of the swing motor 2 comprises a shuttle valve 313 for taking out a pilot pressure A1 or A2 produced from a pilot valve 304, and a lead line 351 for introducing the pilot pressure A1 or A2 taken out by the shuttle valve 313. Further, control force generator means 352 includes a restrictor valve 353 which is subjected to the load-sensing differential pressure Δ PLS, given by a differential pressure between the discharge pressure Ps of the hydraulic pump 1 and the maximum load pressure Pamax, in the valve-closing direction for reducing the pilot pressure produced from the pilot pump 325 dependent on the differential pressure Δ PLS to create a control pressure Pc1 and then for supplying the control pressure Pc1 to the drive part 306 of the distribution compensating valve 301: A restrictor valve 354 is subjected to the load-sensing differential pressure Δ PLS in the valve-closing direction and the pilot pressure A1 or A2 introduced through the lead line 351 oppositely in the valve-opening direction, for reducing the pilot pressure produced from the pilot pump 325 dependent on a difference between the differential pressure Δ PLS and the pilot pressure A1 or A2 to create a control pressure Pc2 and then for supplying the control pressure Pc2 to the drive part 307 of the distribution compensating valve 302. A restrictor valve 355 is subjected to the load-sensing differential pressure Δ PLS in the valve-closing direction for reducing the pilot pressure produced from the pilot pump 325 dependent on the differential pressure Δ PLS to create a control pressure Pc3 and then for supplying the control pressure Pc3 to the drive part 310 of the distribution compensating valve 303.

With this modified embodiment, since the pilot valve 304 is also operated during the combined operation of the swing body and the boom, the pilot pressure A1 or A2 introduced through the shuttle valve 313 and the lead line 351 forcibly moves the restrictor valve 354 in the valve-opening direction. As a result, the larger control pressure Fc2 is introduced to the drive part 307 of the distribution compensating valve 302, so that the larger control force Fc2 is applied to distribution compensating valve 302 in the valve-opening direction for supplying the relatively large flow rate to the boom cylinder 3. During the combined operation of the boom and the arm, since the pilot valve 304 is not operated, the restrictor valves 353, 355 are controlled in accordance with the load-sensing differential pressure Δ PLS, resulting in that the flow rate will not be supplied excessively to the boom cylinder 3, while allowing to supply the sufficient flow rate to the arm cylinder 59 as well.

As mentioned above, the similar advantageous effect to that of the fifth embodiment can be obtained even in the case of designing the control force generator means 352 in a hydraulic configuration.

Incidentally, the foregoing fifth embodiment and the first modification thereof have been explained as including the pressure sensor 314 as drive detecting means for detecting drive of the swing motor 2 and the pressure sensor 341 as drive detecting means for detecting boom-up. However, the present invention is not intended to limit such drive detector means to pressure sensors, and pressure transducers or any means of processing signals in an analog manner may be provided in place of the pressure sensors.

While the foregoing fifth embodiment employs the flow control valves 4, 5 or the like of the pilot-operated type, the flow control valves used in the present invention are not limited to the pilot-operated type and may be of manually-operated type. In the latter case, means for detecting drive of the swing motor 2 can be constituted by a mechanism inclusive of a cam for detecting the movement of a spool of the flow control valve 4 associated with the swing motor 2.

Although several preferred embodiments of the present invention have been described in connection with the case of having the swing motor as an actuator which undergoes a relatively large load pressure and the boom cylinder as an actuator which undergoes a lower load pressure, it will be understood that the present invention is not limited to those actuators, but is and also applicable to any other actuators which exhibit similar load characteristics when driven in a combined manner.

INDUSTRIAL APPLICABILITY

With the hydraulic drive system for construction machines of the present invention, when a first actuator undergoing a relatively large load pressure and a second actuator undergoing a smaller load pressure than that of the first actuator are driven simultaneously, it becomes possible to suppress the loss of energy and improve workability while ensuring the operated extent of the second actuator sufficiently. During simultaneous drive of the second actuator and another actuator other than the first actuator, it becomes possible to carry out good simultaneous drive as conventional without losing a matching property, and hence maintain excellent workability of the combined operation.

What is claimed is:

1. A hydraulic drive system comprising a hydraulic pump, a plurality of hydraulic actuators driven by a hydraulic fluid supplied from said hydraulic pump, a plurality of flow control valves for controlling flow rates of the hydraulic fluid supplied to said actuators, respectively, and a plurality of distribution compensating valves for controlling differential pressures across said flow control valves, respectively, said plurality of actuators including a first actuator which operates under a relatively large load and a second actuator which operates under a smaller load than that of the first actuator, wherein:

said hydraulic drive system further comprises distribution control means for controlling the distribution compensating valve associated with the second actuator such that a differential pressure across the flow control valve associated with the second actuator becomes larger than a differential pressure across the flow control valve associated with the first actuator when the first and second actuators are driven simultaneously;

wherein the plurality of distribution compensating valves are disposed downstream of associated flow control valves, respectively; the distribution compensating valve associated with the first actuator includes piston means having a first pressure receiving portion subjected to a pressure on the downstream side of its associated flow control valve acting in the valve-opening direction, and a second pressure receiving portion subjected to a maximum load pressure among the plurality of actuators acting in the valve-closing direction; and the distribution compensating valve associated with the second actuator includes piston means having a third pressure receiving portion subjected to a pressure on the downstream side of its associated flow control valve acting in the valve-opening direction, and fourth and fifth pressure receiving portions subjected to the maximum load pressure acting in the valve-closing direction, the fourth and fifth pressure receiving portions having the total of their pressure receiving areas substantially equal to the pressure receiving area of the third pressure receiving portion; and wherein said distribution control means includes pressure reducer means, responsive to drive of the first actuator, for cutting off communication of one of the fourth and fifth pressure receiving portions with the maximum load pressure.

2. A hydraulic drive system according to claim 1, wherein:

said piston means of the distribution compensating valve associated with the second actuator comprises first and second pistons corresponding to directions of operation of the second actuator;

each of said first and second pistons includes first and second pressure receiving surfaces for receiving hydraulic fluid pressure in the valve-closing direction;

said fourth pressure receiving portion comprises the first pressure receiving surfaces of both of said first and second pistons;

said fifth pressure receiving portion comprises the second pressure receiving surfaces of both of said first and second pistons; and for at least one piston, the first pressure receiving surface has a different area than the second pressure receiving surface.

3. A hydraulic drive system according to claim 1, wherein:

said piston means of the distribution compensating valve associated with the second actuator comprises first and second pistons corresponding to directions of operation of the second actuator;

each of said first and second pistons includes first and second pressure receiving surfaces for receiving hydraulic fluid pressure in the valve-closing direction;

said fourth pressure receiving portion comprises the first pressure receiving surfaces of both of said first and second pistons; and said fifth pressure receiving portion comprises the second pressure receiving surfaces of both of said first and second pistons.

* * * * *